United States Patent
Nam

(10) Patent No.: US 11,061,496 B2
(45) Date of Patent: Jul. 13, 2021

(54) METHOD AND APPARATUS OF CONTROLLING USER INTERFACE USING TOUCH SCREEN

(71) Applicant: Samsung Electronics Co., Ltd., Suwon-si (KR)

(72) Inventor: Hyeong-Min Nam, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/458,552

(22) Filed: Jul. 1, 2019

(65) Prior Publication Data
US 2019/0324568 A1    Oct. 24, 2019

Related U.S. Application Data

(63) Continuation of application No. 13/898,847, filed on May 21, 2013, now Pat. No. 10,338,705.

(30) Foreign Application Priority Data

May 21, 2012    (KR) .................... 10-2012-0053799

(51) Int. Cl.
| | | |
|---|---|---|
| *G06F 3/048* | (2013.01) | |
| *G06F 3/041* | (2006.01) | |
| *G06F 3/0482* | (2013.01) | |
| *G06F 3/0488* | (2013.01) | |
| *H04M 1/72448* | (2021.01) | |

(52) U.S. Cl.
CPC ............ *G06F 3/041* (2013.01); *G06F 3/0482* (2013.01); *G06F 3/04886* (2013.01); *H04M 1/72448* (2021.01); *H04M 2250/22* (2013.01)

(58) Field of Classification Search
None
See application file for complete search history.

(56) References Cited

U.S. PATENT DOCUMENTS

| | | |
|---|---|---|
| 2005/0162399 A1 | 7/2005 | Yamada |
| 2006/0197753 A1 | 9/2006 | Hotelling |
| | (Continued) | |

FOREIGN PATENT DOCUMENTS

| | | |
|---|---|---|
| JP | 2008-040771 A | 2/2008 |
| JP | 2008-537615 A | 9/2008 |
| | (Continued) | |

OTHER PUBLICATIONS

Tomas Svoboda, Homography from point pairs, Projective transformation, Collineation Revision: 1.4, Sep. 18, 2006, Czech Technical University, Faculty of Electrical Engineering Center for Machine Perception, Prague, Czech Republic.

(Continued)

*Primary Examiner* — Carl Adams
(74) *Attorney, Agent, or Firm* — Jefferson IP Law, LLP

(57) ABSTRACT

A method and an apparatus of controlling a User Interfaces (UIs) using a touch screen are provided. The method includes displaying a menu item in a basic setting menu that is preset in a user device, the menu item being used to select rearrangement of UIs arranged in a display area of the touch screen in a user-touchable partial area, and displaying a rearranged screen displaying the UIs rearranged in the user-touchable partial area, upon sensing of a user touch input selecting the rearrangement of the UIs.

18 Claims, 19 Drawing Sheets

(56) References Cited

U.S. PATENT DOCUMENTS

| | | |
|---|---|---|
| 2007/0150842 A1 | 6/2007 | Chaudhri et al. |
| 2009/0267912 A1 | 10/2009 | Wada |
| 2009/0282352 A1 | 11/2009 | Solanki et al. |
| 2010/0050128 A1 | 2/2010 | Chiang et al. |
| 2010/0182264 A1 | 7/2010 | Hahn et al. |
| 2010/0241985 A1* | 9/2010 | Kim .................. G06F 3/04886 715/773 |
| 2010/0283744 A1 | 11/2010 | Nordenhake et al. |
| 2010/0287468 A1 | 11/2010 | Reifman et al. |
| 2011/0041101 A1 | 2/2011 | Choi |
| 2011/0131533 A1 | 6/2011 | Ku |
| 2011/0199639 A1 | 8/2011 | Tani et al. |
| 2011/0265040 A1 | 10/2011 | Shin et al. |
| 2012/0017177 A1 | 1/2012 | Kim et al. |
| 2012/0069231 A1 | 3/2012 | Chao |
| 2012/0075212 A1* | 3/2012 | Park .................... G06F 3/0488 345/173 |
| 2013/0009903 A1* | 1/2013 | Shiota ................ G06F 3/0486 345/173 |
| 2013/0063423 A1 | 3/2013 | Hsu et al. |
| 2014/0237378 A1 | 8/2014 | Gonen et al. |
| 2014/0320420 A1* | 10/2014 | Ida .................... G06F 3/04186 345/173 |

FOREIGN PATENT DOCUMENTS

| | | |
|---|---|---|
| JP | 2008-261946 A | 10/2008 |
| JP | 2010-061296 A | 3/2010 |
| JP | 2010-108081 A | 5/2010 |
| JP | 2011-86036 A | 4/2011 |
| JP | 2011086036 A | 4/2011 |
| KR | 10-2011-0013733 A | 2/2011 |
| KR | 10-2011-0090447 A | 8/2011 |
| WO | 2010/110550 A1 | 9/2010 |
| WO | 2011/135944 A1 | 11/2011 |

OTHER PUBLICATIONS

English language Translation of JP 2011-086036; Author Hasegawa Minoru; publication date: Apr. 28, 2011.

* cited by examiner

METHOD AND APPARATUS OF CONTROLLING USER INTERFACE USING TOUCH SCREEN

PRIORITY

This application is a continuation application of prior application Ser. No. 13/898,847, filed on May 21, 2013, which was based on and priority under 35 U.S.C. § 119(a) of a Korean patent application number 10-2012-0053799, filed on May 21, 2012 in the Korean Intellectual Property Office, the entire disclosure of which is incorporated by reference herein in its entirety.

BACKGROUND OF THE INVENTION

1. Field of the Invention

The present invention relates to a touch screen that provides a User Interface (UI). More particularly, the present invention relates to a method and apparatus of controlling a UI to increase user convenience.

2. Description of the Related Art

Digital portable terminals, such as smart phones, tablet Personal Computers (PCs), e-book readers, and the like have rapidly gained popularity and their roles, uses and functions have changed. Smart phones, which are being widely used, function additionally as an information processor like a personal information manager, in addition to the role of a personal portable communication device. Accordingly, an object-oriented information input means is used for a digital portable terminal in order to enhance user convenience. For example, the digital portable terminal is equipped with a touch screen to allow a user to input necessary information conveniently and to process the input information. Previously, a user may be inconvenienced when the user selects and inputs information on the touch screen of a digital portable terminal because of the different sizes of the touch screens. In this context, the different sizes of the touch screens are developed and widely equipped for digital portable terminals. Thus, for example, if a larger touch screen relatively in a digital portable terminal is difficult to touch by one-hand users.

FIGS. 1A and 1B illustrate a limitation of a larger touch screen in a digital portable terminal, in terms of a touchable area according to the related art.

Referring to FIGS. 1A and 1B, FIG. 1B illustrates a larger touch screen 100b in a smart phone than a touch screen 100a in a related-art smart phone illustrated in FIG. 1A. A part of the touch screen 100b in the smart phone illustrated in FIG. 1B may be untouchable or inaccessible for touching by a user according to the use environment of an input means because the touch screen 100b is relatively large. For example, the user's hand may be used as the input means of the smart phone. For the convenience of description, a user that manipulates a digital portable terminal with one hand is referred to as a 'one-hand user'. To use a smart phone, a one-hand user should first hold the smart phone. Specifically, the user holds the smart phone with the other four fingers of one hand except for the thumb. Then, the one-hand user inputs information to the smart phone, mainly with a thumb 105.

In FIG. 1A, the one-hand user may reach the entire display area of the touch screen 100a of the related-art smart phone with the thumb 105 to manipulate the touch screen 100a. On the other hand, the manipulation area is confined to a part of the touch screen 100b larger than the touch screen 100a and thus there are areas beyond reach of the thumb 105, i.e. areas that cannot be touched by the thumb 105 or areas above which the thumb 105 cannot be placed, on the touch screen 100b.

In general, UIs are arranged in an array having grids at predetermined intervals on the touch screen or UIs are confined to a specific position on the touch screen in order to receive a user input.

Therefore, if the one-hand user uses the relatively large touch screen 100b, as illustrated in FIG. 1B, a manipulation range available to the one-hand user is limited to a part of the touch screen 100b. In addition, if the touch screen 100b provides UIs in a typical grid structure or UIs beyond the manipulation range, the UI convenience of the one-hand user may further be decreased.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method of determining a part of the display area of a touch screen as a user-touchable area and providing User Interfaces (UIs) in the user-touchable area, and a touch screen using the method.

Another aspect of the present invention is to provide a method of rearranging UIs in a user-touchable area being a part of the display area of a touch screen by adjusting the sizes and positions of the UIs, taking into account user convenience, and a touch screen using the method.

In accordance with an aspect of the present invention, a method of providing UIs on a touch screen is provided. The method includes displaying a menu item in a basic setting menu that is preset in a user device, the menu item being used to select rearrangement of UIs arranged in a display area of the touch screen in a user-touchable partial area, and displaying a rearranged screen displaying the UIs rearranged in the user-touchable partial area, upon sensing of a user touch input selecting the rearrangement of the UIs.

In accordance with another aspect of the present invention, a touch screen apparatus of providing UIs is provided. The touch screen apparatus includes a display unit displaying a menu item in a basic setting menu that is preset in a user device, the menu item being used to select rearrangement of UIs arranged in a display area of the touch screen apparatus in a user-touchable partial area, and a controller controlling the display unit to display a rearranged screen including the UIs rearranged in the user-touchable partial area, upon sensing of a user touch input selecting the rearrangement of the UIs.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1A:
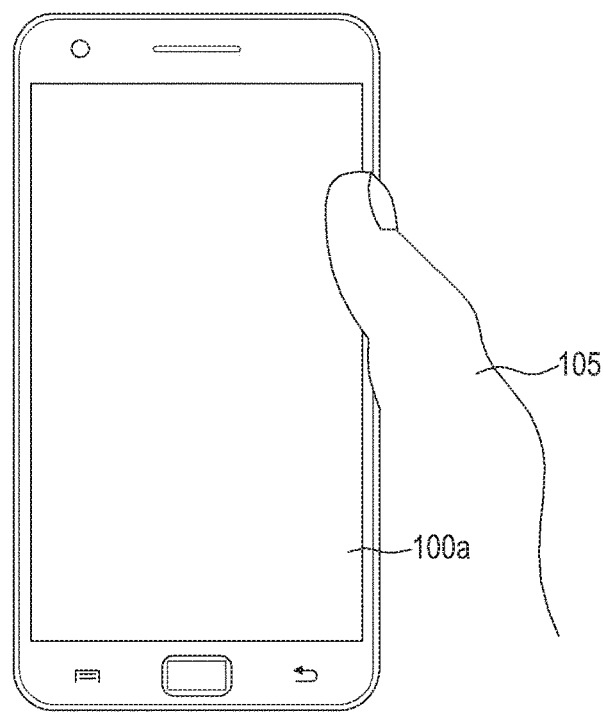
FIGS. 1A and 1B illustrate a limitation of using a touch screen with an increased size in a digital portable terminal, in terms of a user-touchable area according to the related art.
Figure 1B:
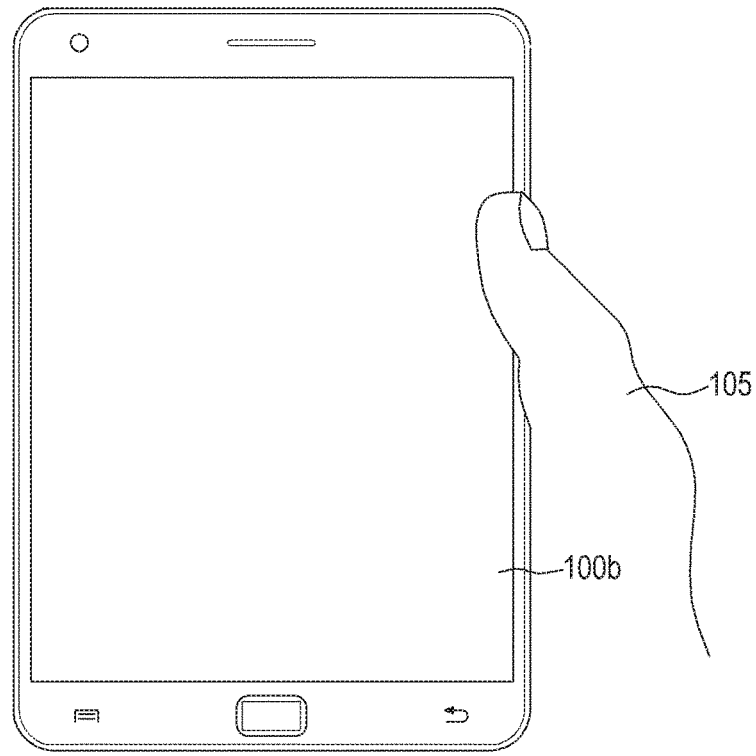

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention will be provided to achieve the above-described technical aspects of the present invention. In an exemplary implementation, defined entities may have the same names, to which the present invention is not limited. Thus, exemplary embodiments of the present invention can be implemented with same or ready modifications in a system having a similar technical background.

The present invention provides a method of determining a part of a touch screen having a user-untouchable display area as a user-touchable area and rearranging User Interfaces (UIs) in the user-touchable area. In the present exemplary embodiments, UIs may be any graphical element displayed on a touch screen that a user may interact and/or interface with, such as a button, an icon, a symbol, a command, a picture, a video, and any other similar and/or suitable element that is graphically displayed on a touch screen and/or display device. The following description is given with the appreciation that an input means for a touch screen having a user-untouchable display area is a user's one hand, by way of example. However, the present invention is not limited thereto, and the input means may be any suitable and/or similar input means, such as any finger of a user and a stylus.

For the convenience of description, a user that manipulates a digital portable terminal with one hand is referred to as a 'one-hand user'. However, it is to be clearly understood that the input means is not limited to a user's one hand in the present invention.

A touchable part of the display area of a touch screen is defined as a user-touchable area according to an exemplary embodiment of the present invention. The user-touchable area includes an area touchable by an input means and an area above which the input means may be placed although the input means does not contact the touch screen in the display area of the touch screen. When the input means is placed above the touch screen, an input to the touch screen, for example, a motion of a user's hand or a stylus pen is recognized by motion recognition.

The touch screen of the present exemplary embodiments may have a relatively large screen size, compared to a related-art touch screen. As long as a touch screen includes the user-untouchable area, i.e. an area untouchable and/or unreachable by an input means according to a user's reach or an area above which the input means cannot be placed, the present exemplary embodiments are applicable to the touch screen.

In exemplary embodiments of the present invention, it is assumed that an input means by which to determine a user-touchable partial area is a thumb of a one-hand user. In this case, the user-touchable partial area is called a comfort zone defined as an area touchable by the thumb. While the exemplary embodiments of the present invention will be described using the term 'comfort zone', the comfort zone is interchangeable with the user-touchable partial area having the same meaning.

Figure 2:
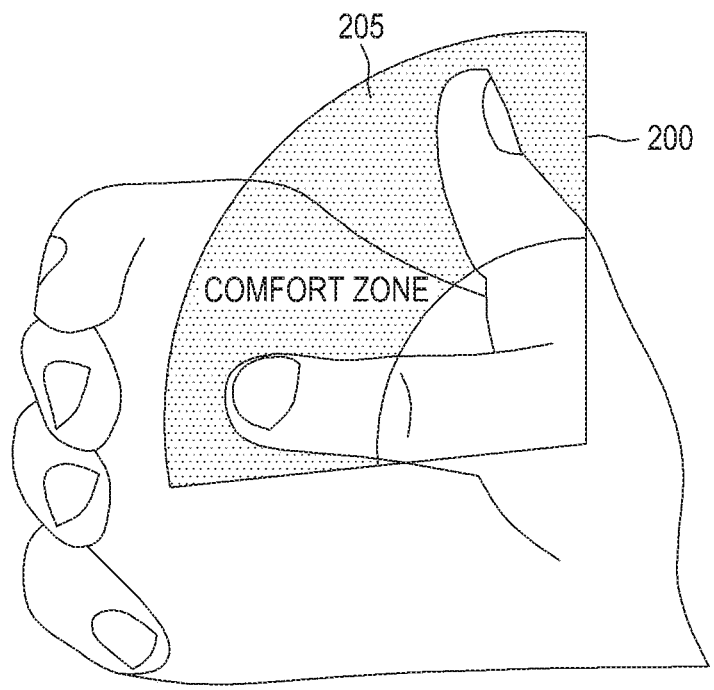
FIG. 2 illustrates a comfort zone defined according to an exemplary embodiment of the present invention.

FIG. 2 illustrates a comfort zone defined according to an exemplary embodiment of the present invention.

Referring to FIG. 2, when a one-hand user manipulates a portable digital terminal having a touch screen with one hand, the one-hand user may shape the hand as illustrated in FIG. 2. The one-hand user holds the digital portable terminal with the other four fingers of the hand except for the thumb. Thus, the user inputs information such as a specific request by touching the display area of the touch screen with the thumb. A fan-shaped area 200 defines a range in which the thumb may reach on the touch screen.

In an exemplary embodiment of the present invention, a comfort zone 205 may be defined as an area which can be touched by the thumb of the one-hand user or an area above which the thumb can be placed, i.e. the whole fan-shaped area 200. In another exemplary embodiment of the present invention, the comfort zone 205 may be defined as a part of the fan-shaped area 200, which is readily touchable by the thumb or easily sensible, e.g. a shaded part of the fan-shaped area 200.

Exemplary embodiments of the present invention provide a method of rearranging UIs in a comfort zone by adjusting the positions, intervals, and layout of the UIs so that the one-hand user may conveniently manipulate a user device. The exemplary embodiments of the present invention also provide additional UIs with which a user uses UIs rearranged in a comfort zone, taking into account user experience.

Figure 3:
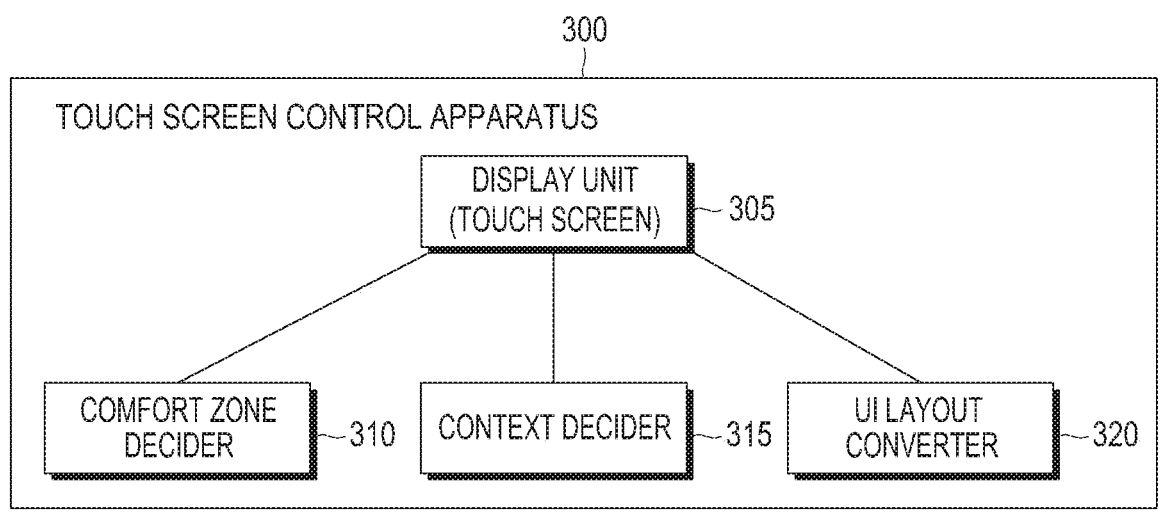
FIG. 3 is a block diagram of a touch screen control apparatus according to an exemplary embodiment of the present invention.

FIG. 3 is a block diagram of a touch screen control apparatus according to an exemplary embodiment of the present invention.

Referring to FIG. 2, a touch screen control apparatus 300 performs specific operations to display information on the touch screen of a digital portable terminal that a one-hand user manipulates. The touch screen control apparatus 300 includes a display unit 305 which may be a touch screen, a comfort zone decider 310, a context decider 315, and a UI layout converter 320. The display unit 305 may be any type of display unit for displaying graphical information, such as a Liquid Crystal Display (LCD) unit, a Light Emitting Diode (LED) display unit, a Thin-Film Transistor (TFT) display unit, an Organic LED (OLED) display unit, or any other similar and/or suitable type of display unit. The detailed configuration of the touch screen control apparatus 300 is purely exemplary. Accordingly, the comfort zone decider 310, the context decider 315, and the UI layout converter 320 may be integrated into a single component or may be divided into more components.

The comfort zone decider 310, the context decider 315, and the UI layout converter 320 may be incorporated into a controller (not shown), or any other similar and/or suitable type of hardware, in a digital portable terminal having the touch screen control apparatus 300 of FIG. 3. The controller may be configured as at least one processor having a program to control the operation of the display unit 305 and UI operations according to the exemplary embodiments of the present invention. To sense a user's motion, the touch screen control apparatus 300 may further include a motion sensor (not shown).

The comfort zone decider 310 receives a user input needed to determine a comfort zone and determines a comfort zone based on the user input. The context decider 315 determines the type of content for which a current UI is activated. The UI layout converter 320 renders a graphic image on the display unit 305 and re-adjusts a screen configuration including the sizes, intervals, and layout of UIs in the determined comfort zone according to an exemplary embodiment of the present invention. The display unit 305 displays a graphic image including the UIs rearranged in the comfort zone in a display area. Operations of the components of the touch screen control apparatus 300 will be described below in greater detail.

Figure 4A:
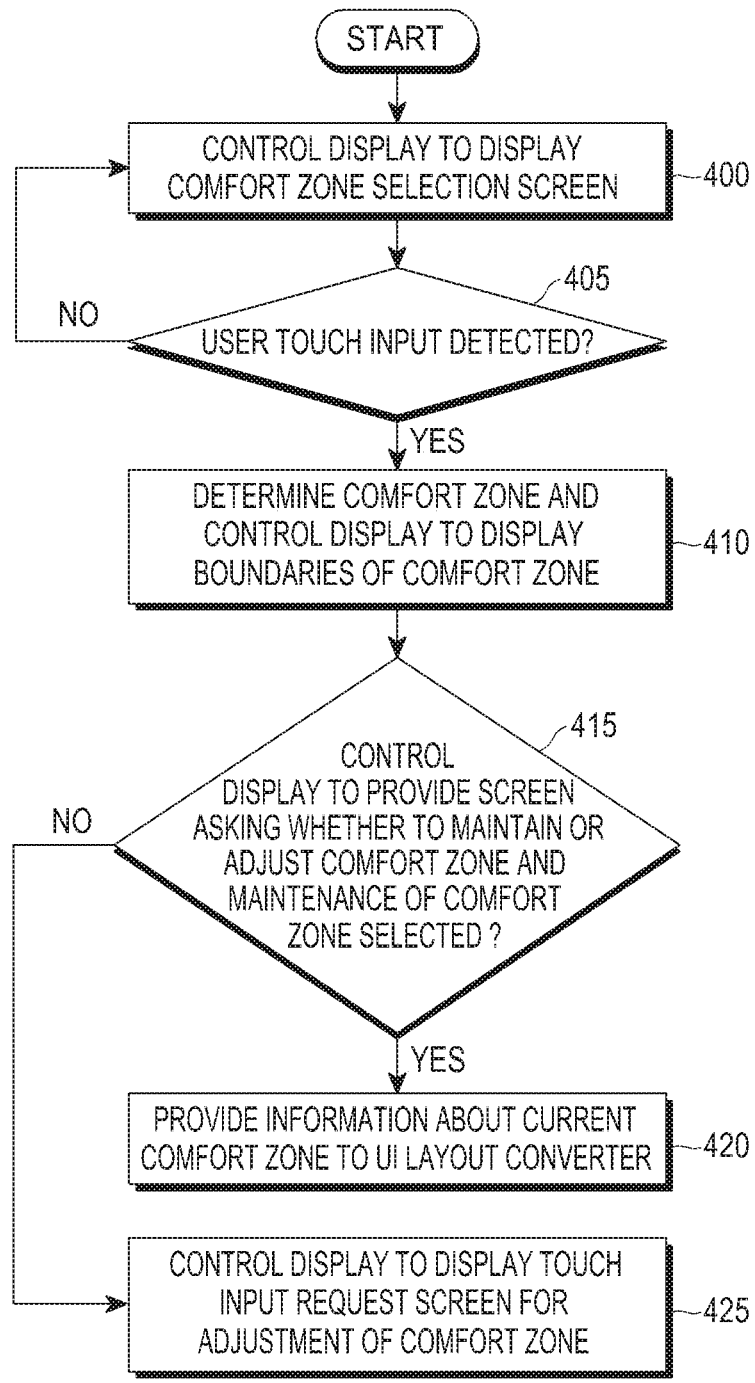
FIG. 4A is a flowchart illustrating an operation of a comfort zone decider in the touch screen control apparatus according to an exemplary embodiment of the present invention.
Figure 4B:
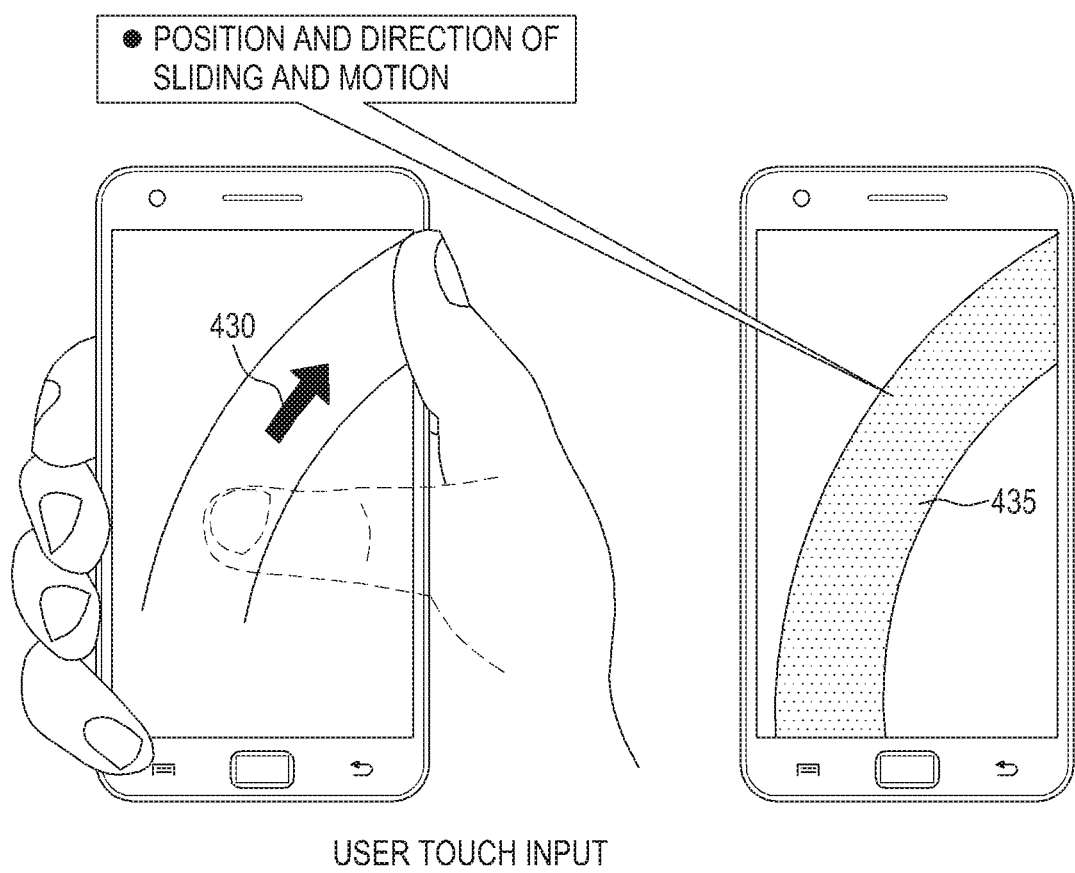
FIG. 4B illustrates a touch input request screen according to an exemplary embodiment of the present invention.
Figure 4C:
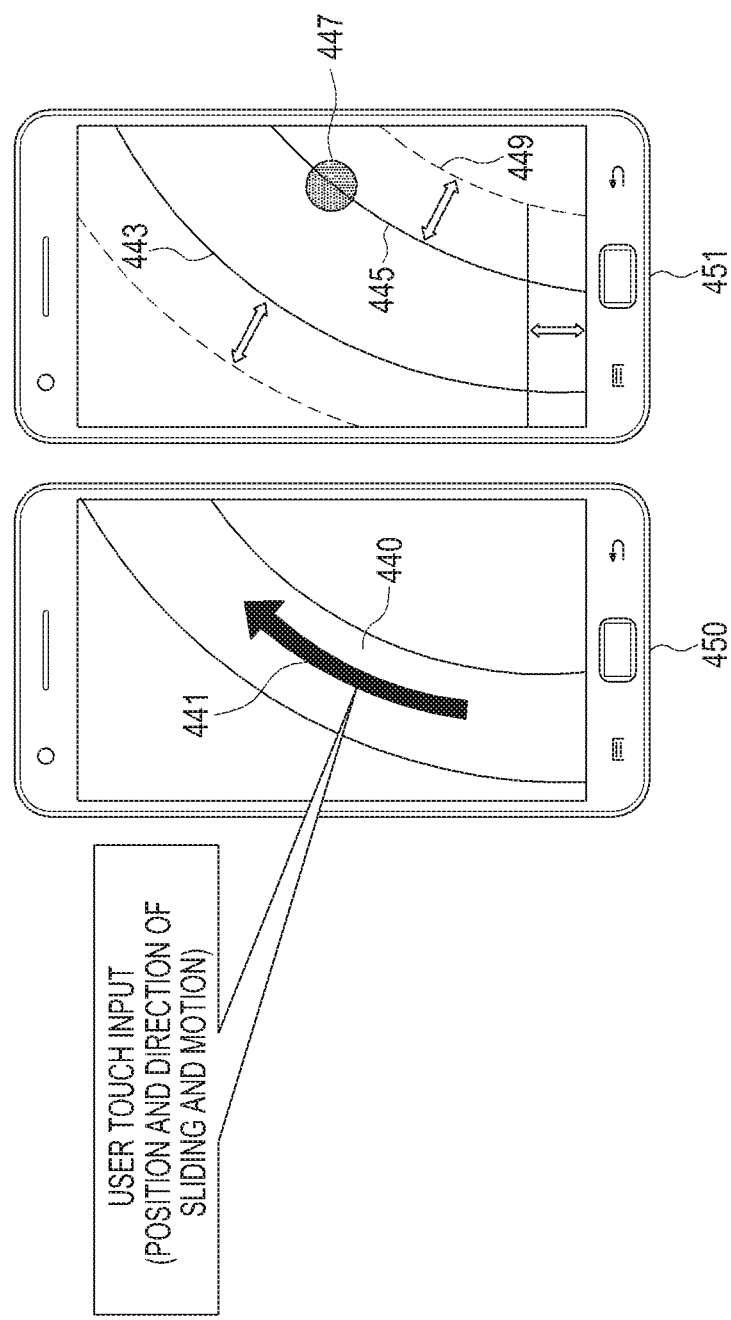
FIG. 4C illustrates a method of determining a comfort zone according to an exemplary embodiment of the present invention.

FIG. 4A is a flowchart illustrating an operation of a comfort zone decider in a touch screen control apparatus according to an exemplary embodiment of the present invention, FIG. 4B illustrates a user touch input according to an exemplary embodiment of the present invention, and FIG. 4C illustrates a method of determining a comfort zone according to an exemplary embodiment of the present invention.

Referring to FIGS. 4A, 4B, and 4C, for the convenience of description, the comfort zone decider is the comfort zone decider 310 of FIG. 3. The comfort zone decider 310, in step 400, controls the display unit 305 to display a comfort zone selection screen (not shown) to determine a comfort zone and then proceeds to step 405. The comfort zone selection may be, for example, a locked home screen or an additional screen requesting a user touch input. Whether the display unit 305 is to display the locked home screen or the additional screen requesting a user touch input may be preset by a user or by default by a manufacturer.

In step 405, the comfort zone decider 310 determines whether a user touch input has been detected.

As shown in FIG. 4B, the one-hand user touches the touch screen corresponding to the display unit 305. Specifically, the one-hand user touches a partial area 430 of the touch screen with a thumb. The touch includes a sliding or drag motion. For example, if a locked home screen is provided as a comfort zone selection, the one-hand user may unlock the screen by sliding or dragging the thumb across the touch screen.

Upon detection of a thumb-touched partial area 435 of the touch screen in the user touch input applied to unlock the screen, the comfort zone decider 310 determines that a user touch input has been detected and goes to step 410. On the contrary, in the absence of a user touch input or if detection of a user touch input is not recognized, the comfort zone decider 310 awaits reception of a user touch input in step 400. Specifically, the comfort zone decider 310 may await reception of a user touch input to unlock the screen or may control the display unit 305 to display an additional touch input request screen on the touch screen. In another exemplary embodiment of the present invention, if a user touch input has not been received after a predetermined amount of time, the comfort zone decider 310 may provide a screen from which the user may select a preset default comfort zone. Default comfort zones will be described later in greater detail.

In step 410, the comfort zone decider 310 determines the partial area touched by the thumb as a comfort zone. As shown in FIG. 4C, a user-touchable partial area 440 is not confined to an actual area touched by a thumb of a one-hand user. Specifically, if the one-hand user touches only a specific part 441 of the area 440 with the thumb as illustrated in screen 450 of FIG. 4C, the comfort zone decider 310 determines whether the user has slid or dragged the thumb, for example, from right to left or from left to right, estimates a touchable area based on the specific touched area and the touched direction, and determines the estimated touchable area as a comfort zone.

Once the comfort zone is determined, the comfort zone decider 310 controls the display unit 305 to display the comfort zone so that the user may identify the comfort zone. For example, the display unit 305 may display the boundaries of the comfort zone or the full comfort zone on the touch screen. The comfort zone decider 310 controls the display unit 305 to display a screen that prompts the user to maintain or adjust the comfort zone in step 415. Then the comfort zone decider 310 receives a user input in response to the question. The providing of the screen asking the user whether to maintain or adjust a comfort zone may be set by default in the digital portable terminal by the manufacturer or freely set by the user during initial setting of the digital portable terminal, and the screen may be configured to prompt the user to make a choice between maintenance and adjustment of a comfort zone.

If the user input indicates maintenance of the comfort zone, then the comfort zone decider 310 determines the determined comfort zone as a current comfort zone and provides information about the current comfort zone to the UI layout converter 320 in step 420. On the contrary, if the user input indicates adjustment of the comfort zone, then the comfort zone decider 310 controls the display unit 305 to provide a touch input request screen so that the user may adjust the comfort zone in step 425. Specifically, the display unit 305 displays boundaries 443 and 445 of the determined comfort zone on the touch screen under the control of the comfort zone decider 310, as illustrated in screen 451 of FIG. 4C. If the one-hand user touches, for a predetermined amount of time, a specific point 447 on the boundary 445 that the user wants to adjust, then the boundary 445 is placed in an adjustable state. Then the user adjusts the size of the comfort zone by dragging the clicked boundary 445 to an intended position 449. The other boundary 443 may be adjusted in the same manner.

Clicking and/or dragging used to adjust a comfort zone is an exemplary user input. Therefore, an operation of placing a boundary of a comfort zone to an adjustable state and an operation of adjusting the selected boundary may be performed by predefined various inputs. For example, when a boundary of a comfort zone is placed in an adjustable state by clicking on the boundary, then the boundary of the comfort zone may be changed by a predetermined extent at each click or each time a predetermined motion is recognized.

When the comfort zone is maintained or adjusted in the above manner, the context decider 315 determines the type of content to be provided in the comfort zone.

Table 1 below lists exemplary content types that the context decider 315 of the touch screen control apparatus 300 determines to provide on UIs in the comfort zone. If content is provided on UIs with no distinction made between a comfort zone and a non-comfort zone or if content of a predetermined type is provided on UIs in the comfort zone, then the context decider 315 may not be included in the touch screen control apparatus 300.

TABLE 1

| Content Type | Example |
| --- | --- |
| Icons | Icons on launcher screen |
| Application control UI | Play, stop, pause, etc. of video player |
| Page view | Next or previous page on e-book, Web page, etc. |
| List view | Lists |

Referring to Table 1, content types include, for example, icons, an application control UI, a page view, and a list view. For example, the icons are arranged on a home screen displayed on the touch screen of a digital portable terminal that a one-hand user manipulates and each icon provides a function of executing an application mapped to the icon.

The application control UI provides a function of executing a manipulation function such as play, stop, pause and the like of a video player. The page view provides a function of returning to the previous page or moving to the next page on an e-book or a Web page. The list view provides a function of listing specific items on the touch screen.

Figure 5A:
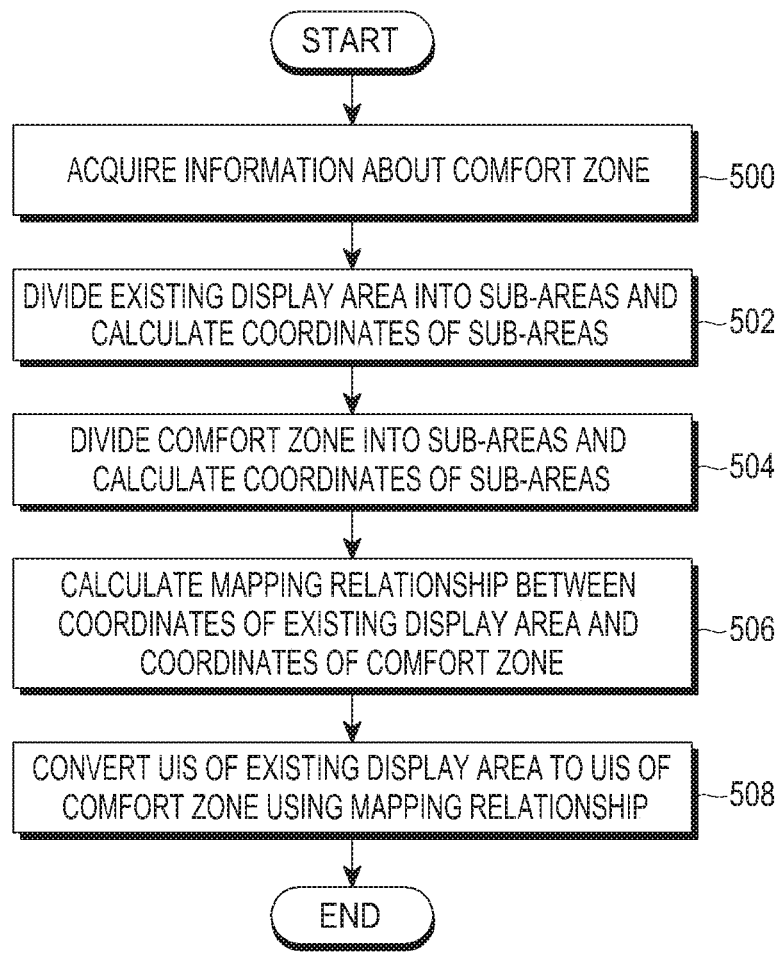
FIG. 5A is a flowchart illustrating an operation of a User Interface (UI) layout converter in the touch screen control apparatus according to an exemplary embodiment of the present invention.

FIG. 5A is a flowchart illustrating an operation of a UI layout converter in a touch screen control apparatus according to an exemplary embodiment of the present invention.

Referring to FIG. 5A, for the convenience of description, the UI layout converter is the UI layout converter 320 of FIG. 3. The UL layout converter 320 acquires information about a determined comfort zone from the comfort zone decider 310 in step 500. In step 502, the UI layout converter 320 divides an existing display area prior to a layout change to the comfort zone, which may be referred to as an existing display area, into a plurality of sub-areas and calculates the coordinates of each sub-area. While rectangles, parallelograms, trapezoids, and the like are available as the shapes of the sub-areas, the following description will be given in the context of each sub-area being a parallelogram, by way of example.

In step 504, the UI Layout converter 320 divides the comfort zone into sub-areas and calculates coordinates of the sub-areas. In step 506, the UI layout converter 320 calculates a mapping relationship between the coordinates of the display area and the coordinates of the comfort zone. A manner in which the UI layout converter 320 calculates the mapping relationship will be described later in greater detail according to an exemplary embodiment of the present invention. In step 520, the UI layout converter 320 converts UIs arranged in the existing display area to UIs for the comfort zone.

Figure 5B:
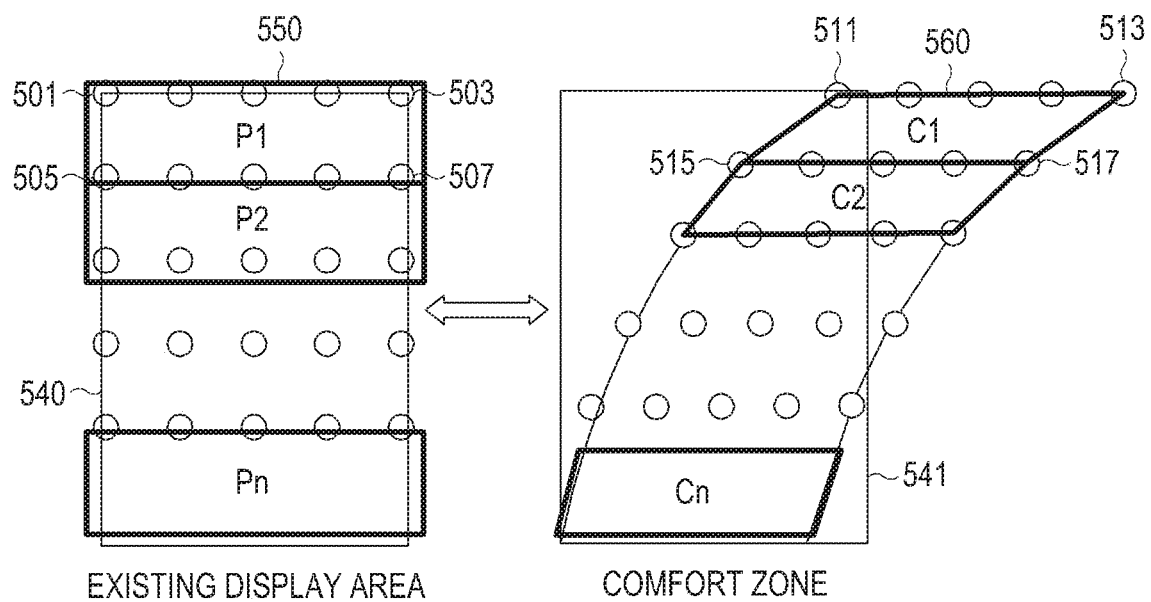
FIG. 5B illustrates two-dimensional projective transformation between an existing display area and a current comfort zone according to an exemplary embodiment of the present invention.

FIG. 5B illustrates two-dimensional projective transformation between an existing display area and a current comfort zone according to an exemplary embodiment of the present invention.

Referring to screen 540 of FIG. 5B, an existing display area 550 is divided into, for example, sub-areas, e.g. n rectangles $P_1, P_2, \ldots, P_n$, each having a predetermined size along a vertical axis in step 502. Referring to screen 541 of FIG. 5B, a comfort zone 560 is divided into sub-areas, e.g. n squares $C_1, C_2, \ldots, C_n$, corresponding to the n rectangles $P_1, P_2, \ldots, P_n$ in step 504.

In step 506, the UI layout converter 320 determines the mapping relationship between the coordinates of the n rectangles $P_1, P_2, \ldots, P_n$ and the coordinates of the squares $C_1, C_2, \ldots, C_n$ by two-dimensional projective transformation. For example, the two-dimensional projective transformation may be defined as the following table.

TABLE 2

2D Projective Transform[1]

Sometimes called homography or collineation.
A projective transformation is a special transformation which relates the Coordinate system $X = [x_1, x_2]^T$ with $u = [u_1, u_2]^T$ by $$x_1 = \frac{a_{11}u_1 + a_{12}u_2 + a_{13}}{a_{31}u_1 + a_{32}u_2 + a_{33}} \text{ and }$$

$$x_2 = \frac{a_{21}u_1 + a_{22}u_2 + a_{23}}{a_{31}u_1 + a_{32}u_2 + a_{33}}$$

Such expressions can be written in a compact way as $$x_1 = \frac{A_1[u^T, 1]^T}{A_3[u^T, 1]^T},$$

$$x_2 = \frac{A_2[u^T, 1]^T}{A_3[u^T, 1]^T}$$

Where $$A = \begin{bmatrix} A_1 \\ A_2 \\ A_3 \end{bmatrix} = \begin{bmatrix} a_{11} & a_{12} & a_{13} \\ a_{21} & a_{22} & a_{23} \\ a_{31} & a_{32} & a_{33} \end{bmatrix}.$$

In order to further explanation of equations in Table 2, FIG. 5B will be referred to. A first rectangle P1, which is divided from the existing display area 550, may be represented by the coordinates of four points 501, 503, 505 and 507. The square C1 of the comfort zone 560 corresponding to the rectangle $P_1$ may be represented by the coordinates of four points 511, 513, 515 and 517. The UI layout converter 320 calculates a matrix A having, as elements, mapping relationships between the coordinates of the points 501, 503, 505, and 507 of the rectangle P1 and the coordinates of the points 511, 513, 515, and 517 of the square C1 by two-dimensional projective transformation.

For example, if $x=[x_1, x_2]^T$ is the coordinates of the first point 501 of the rectangle $P_1$ and $u=[u_1, u_2]^T$ is the coordinates of the first point 511 of the square $C_1$ in Table 2, the UI layout converter 320 may express the coordinates $x_1$ and $x_2$ of the first point 501 of the rectangle $P_1$ using the coordinates $u_1$ and $u_2$ of the first point 511 of the square $C_1$ according to Equation 1.

$$x_1 = \frac{a_{11}u_1 + a_{12}u_2 + a_{13}}{a_{31}u_1 + a_{32}u_2 + a_{33}} \text{ and } x_2 = \frac{a_{21}u_1 + a_{22}u_2 + a_{23}}{a_{31}u_1 + a_{32}u_2 + a_{33}} \quad \text{Equation (1)}$$

To obtain the matrix A, the UI layout converter 320 changes $x_1$ and $x_2$ in Equation 1 to the expression of Equation 2.

$$x_2 = \frac{A_2[u^T, 1]^T}{A_3[u^T, 1]^T}, x_1 = \frac{A_1[u^T, 1]^T}{A_3[u^T, 1]^T} \quad \text{Equation (2)}$$

Variables $A_1$, $A_2$, and $A_3$ obtained by Equation 2 are represented respectively as $A_1=[a_{11}, a_{12}, a_{13}]$, $A_2=[a_{21}\ a_{22}\ a_{23}]$, and $A_3=[a_{31}, a_{32}, a_{33}]$.

Then the UI layout converter 320 determines the matrix A with a total of nine elements $a_{11}, a_{12}, a_{13}, a_{33}$ of the variables $A_1, A_2$, and $A_3$. The matrix A is expressed as Equation (3).

$$A = \begin{bmatrix} A_1 \\ A_2 \\ A_3 \end{bmatrix} = \begin{bmatrix} a_{11} & a_{12} & a_{13} \\ a_{21} & a_{22} & a_{23} \\ a_{31} & a_{32} & a_{33} \end{bmatrix} \quad \text{Equation (3)}$$

Therefore, one of the coordinate pairs, i.e. a first coordinate pair, of the existing display area 550 and one of the coordinate pairs, i.e. a second coordinate pair, of the comfort zone 560 may be expressed as a matrix A with nine elements.

If the comfort zone 560 determined by the comfort zone decider 310 is known, then the coordinates of the four points 511, 513, 515 and 517 of the square $C_1$ corresponding to the coordinates of the four points 501, 503, 505 and 507 of the rectangle $P_1$ may be obtained. Accordingly, once the four coordinate pairs of the rectangle $P_1$ and the four coordinate pairs of the square $C_1$ corresponding to the rectangle $P_1$ are determined, four implementations of Equation 1 and four implementation of Equation 2 describe the respective mapping relationships between the four coordinate pairs of the rectangle $P_1$ and the four coordinate pairs of the square $C_1$, and thus a total of eight equations exist. Then any point of the rectangle $P_1$ may be converted to a point of the square $C_1$ using one matrix A describing the mapping relationship between the rectangle $P_1$ and the square $C_1$.

Matrices A are calculated with regards to the mapping relationships between the coordinates of the other rectangles $P_2, \ldots, P_n$ and the coordinates of the other squares $C_2, \ldots, C_n$ in the same manner. Then the coordinates of a point of a rectangle are converted to the coordinates of a point of a parallelogram corresponding to the rectangle, i.e. the coordinates of a point of the comfort zone 560.

In summary, the UI layout converter 320 calculates a matrix A using the first coordinate pairs of four points of each of the sub-areas of an existing display area 550 and the second coordinate pairs of four points of a comfort zone 560, e.g. the coordinates of the points of a parallelogram, corresponding to the first coordinate pairs by Least Square (LSQ) formulation, such as a least square method, RANdom Sample Consensus (RANSAC), or the like. For example, an equation of calculating the elements of the matrix A by LSQ formulation is given as Table 3.

TABLE 3

Computation of A from point correspondences LSQ formulation

We form a vector a from elements of the matrix A:
$a = [A_1, A_2, A_3] = [a_{11}, a_{12}, a_{13}, a_{21}, a_{22}, a_{23}, a_{31}, a_{32}, a_{33}]^T$. Using all correspondences having at hand, the homogeneous equations are written as $$\begin{bmatrix} u_1^1 & u_2^1 & 1 & 0 & 0 & 0 & -x_1^1 u_1^1 & -x_1^1 u_2^1 & -x_1^1 \\ 0 & 0 & 0 & u_1^1 & u_2^1 & 1 & -x_2^1 u_1^1 & -x_2^1 u_2^1 & -x_2^1 \\ \vdots & \vdots & \vdots & \vdots & \vdots & \vdots & \vdots & \vdots & \vdots \\ \vdots & \vdots & \vdots & \vdots & \vdots & \vdots & \vdots & \vdots & \vdots \\ u_1^n & u_2^n & 1 & 0 & 0 & 0 & -x_1^n u_1^n & -x_1^n u_2^n & -x_1^n \\ 0 & 0 & 0 & u_1^n & u_2^n & 1 & -x_2^n u_1^n & -x_2^n u_2^n & -x_2^n \end{bmatrix} a = Ca = 0$$

LSQ formulation $$a = \mathrm{argmin} \|Ca^*\|^2$$
$$\|a^*\| = 1$$

Solution of the above problem is covered by the constrained_lsq[1] talk.
[1] http://cmp.felk.cvut.cz/cmp/courses/EZS/Lectures/constrained_lsq.pdf Referring to Table 3, the UI layout converter 320 may express vector a from the elements of the matrix A according to Equation 4

$$a = [A_1, A_2, A_3] = [a_{11}, a_{12}, a_{13}, a_{21}, a_{22}, a_{23}, a_{31}, a_{32}, a_{33}]^T \quad \text{Equation 4}$$

Then the UI layout converter 320 may obtain the comfort zone conversion vector an expressed as Equation 6 by representing a homogeneous equation according to Equation 5.

$$\begin{pmatrix} u_1^1 & u_2^1 & 1 & 0 & 0 & 0 & -x_1^1 u_1^1 & -x_1^1 u_2^1 & -x_1^1 \\ 0 & 0 & 0 & u_1^1 & u_2^1 & 1 & -x_2^1 u_1^1 & -x_2^1 u_2^1 & -x_2^1 \\ \vdots & \vdots & \vdots & \vdots & \vdots & \vdots & \vdots & \vdots & \vdots \\ u_1^n & u_2^n & 1 & 0 & 0 & 0 & -x_1^n u_1^n & -x_1^n u_2^n & -x_1^n \\ 0 & 0 & 0 & u_1^n & u_2^n & 1 & -x_2^n u_1^n & -x_2^n u_2^n & -x_3^n \end{pmatrix} a = Ca = 0. \quad \text{Equation (5)}$$

LSQ formulation $$a = \underset{\|a^*\|=1}{\mathrm{argmin}} \|Ca^*\|^2 \quad \text{Equation (6)}$$

The UI layout converter 320 calculates matrices A that describe the mapping relationships between the first coordinate pairs of the points of each sub-area divided from the existing display area and the second coordinate pairs of the points of each sub-area divided from the comfort zone in step 506 and converts UIs in the existing display area to UIs in the comfort zone based on the matrices A in step 508. Specifically, the mapping relationship A between each sub-area of the existing display area and a corresponding sub-area of the comfort zone is determined. Then the coordinates of UIs within the sub-areas of the existing display area are converted to coordinates corresponding to the UIs in the sub-areas of the comfort zone based on the determined matrices A. The first coordinate pairs of the positions of the UIs in the existing display area may be converted to the second coordinate pairs of positions of the UIs in the comfort zone. While not shown in FIG. 5A, the UI layout converter 320 may adjust at least one of the positions, sizes, and shapes of the UIs in the comfort zone.

Figure 6:
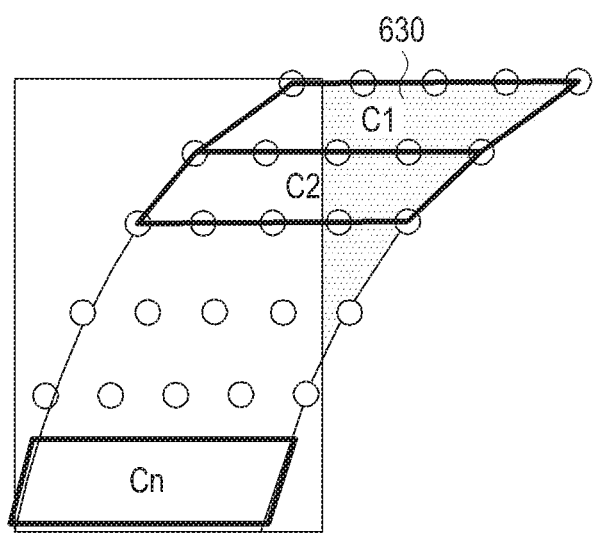
FIG. 6 illustrates a comfort zone according to an exemplary embodiment of the present invention.

FIG. 6 illustrates a comfort zone according to an exemplary embodiment of the present invention.

Referring to FIG. 6, an outer area 630, shown as a shaded part, of the comfort zone may be outside the boundary of the display area of the touch screen. The comfort zone may be larger or smaller than the existing display area. Compared to the display area, the comfort zone may be streamlined or distorted in shape. Therefore, there may exist a need for adjusting the sizes, intervals, and layout of icons displayed in the display area, when the display area is transformed to the comfort zone. Specifically, the UI layout converter 320 may move UIs located in the outer area 630 to the next page, scale down the sizes of the UIs, or change the shapes of the UIs by adjusting at least one of the positions, sizes, and shapes of UIs, e.g. icons, arranged in the comfort zone, so that the UIs of the outer area 630 may reside within the comfort zone. Alternatively, the UI layout converter 320 may control the display unit 305 to display an additional screen requesting a user input for UI adjustment. The UI layout converter 320 may also control the display unit 305 to display a screen requesting input of the number of uses of each icon. For example, upon receipt of the number of uses of each icon, the UI layout converter 320 may control the display unit 305 to arrange icons having the numbers of uses smaller than a predetermined threshold in the outer area 630. Adjustment of UIs in the comfort zone may be optional.

The exemplary embodiments have described above with reference to FIGS. 5A, 5B and 6 such that UIs of an existing display area are converted to UIs of a comfort zone by two-dimensional projective transformation according to the exemplary embodiment of the present invention. However, the two-dimensional projective transformation is an exemplary method of converting UIs of the display area to UIs of the comfort zone and thus the present invention is not limited to the two-dimensional projective transformation.

A method of converting UIs of an existing display area to UIs of a comfort zone according to another exemplary embodiment of the present invention will be described. A plurality of default comfort zones are pre-stored during initial setting of a touch screen by the manufacturer. The default comfort zones are formed into shapes that users are likely to frequently use. It is also possible for the comfort zone decider 310 to additionally determine a comfort zone based on a user's preference according to a user selection. If each of the default comfort zones includes UIs transformed from UIs of the display area, upon user selection of one of the default comfort zones, an operation of adjusting preset UIs of the selected default comfort zone may be performed selectively.

Figure 7:
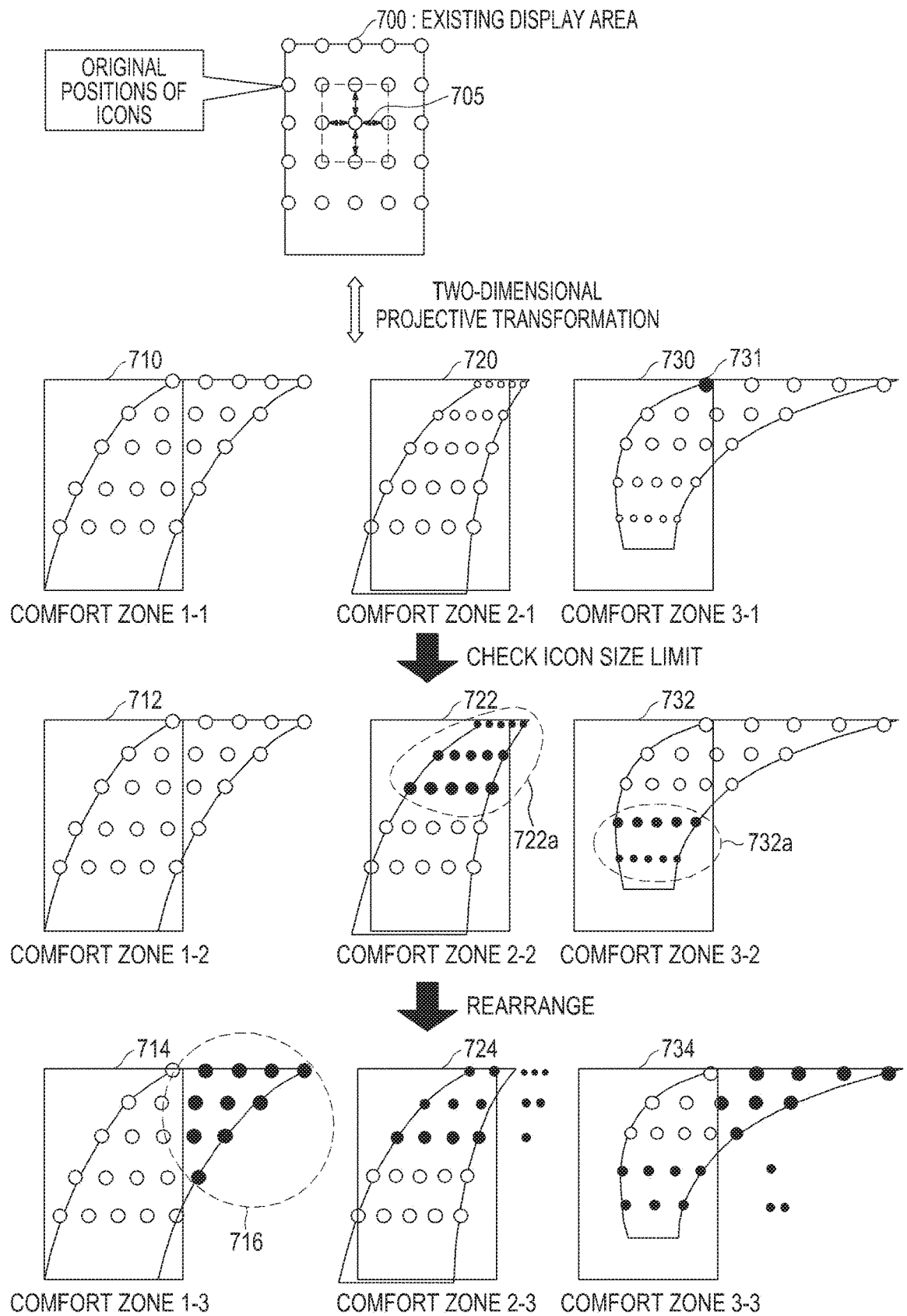
FIG. 7 illustrates the shapes of various comfort zones and the positions and sizes of icons rearranged in the comfort zones according to an exemplary embodiment of the present invention.

FIG. 7 illustrates the shapes of various comfort zones and the positions and sizes of icons adjusted according to the shapes of the comfort zones according to an exemplary embodiment of the present invention.

Referring to FIG. 7, while icons are taken as an exemplary content type displayed in a display area 700, the present invention is not limited thereto, and the present exemplary embodiment is also applicable to other types of content such as a control UI, a page view, and a list view.

The display area 700 generally displays icons across the whole area of a touch screen. For example, the icons are arranged equidistantly at their original positions 705. Each icon is spaced from its upper, lower, left, and right adjacent icons by the same distance. The icons displayed in the display area 700 are of the same size. While the icons have the same distance and size in the exemplary embodiment of FIG. 7, the sizes and positions of icons arranged in the display area may be adjusted according to a user setting. The icons mapped to the display area 700 are rearranged at new coordinates in a predetermined comfort zone by two-dimensional projective transformation described above with reference to the exemplary embodiments of FIGS. 5A and 5B.

In an exemplary embodiment of the present invention, various shapes are available to a comfort zone according to a user input. In the exemplary embodiment of FIG. 7, the icons of the display area 700 are displayed at new coordinates corresponding to the original icon positions 705 in comfort zones 710, 720 and 730, which may also be respectively referred to as comfort zones 1-1, 2-1, and 3-1. Specifically, the icons of the display area 700 are moved to new coordinates mapped to the original positions of the icons in comfort zone 1-1, while the sizes of the icons are still kept unchanged. An area available to the icons gets narrower from bottom to top in comfort zone 2-1, relative to the display area 700. Therefore, the icons are arranged at new coordinates mapped to their original positions with sizes and intervals decreased in correspondence with a rate at which the area of the comfort zone 2-1 gets narrower.

The icons are arranged at new coordinates mapped to their original positions 705, with sizes inversely proportional to the number of their adjacent icons along the horizontal axis in comfort zone 3-1. Specifically, an icon 731 arranged in the top row of comfort zone 3-1 is large relative to its original size because it does not have any adjacent icon arranged along the horizontal axis on a current page. On the other hand, icons arranged in the bottom row of comfort zone 3-1 are small relative to the icon 731 because each of the bottom-row icons has the most adjacent icons along the horizontal axis on the current page.

Icons needing size adjustment are selected from comfort zones 1-1, 2-1, and 3-1. These selected icons are shown as black spots in comfort zones 712, 722 and 732, which may be referred to as comfort zones 1-2, 2-2, and 3-2. Icons may be selected for size adjustment based on the size of a preset default icon. Alternatively, the UI layout converter 320 may control the display unit 305 to display a screen that prompts a user to input an icon selection criterion.

For example, comfort zone 1-2 keeps the original sizes of the icons. The original sizes of the icons are set according to a user's preference or by default during initial setting of the display area 700. If the icons are displayed at their original sizes, the user is likely to feel convenient. Thus, no icons are shown as selected in comfort zone 1-2. Relatively small icons are shown as selected in comfort zone 2-2. Specifically, icons 722a, which are arranged in the first to third rows, are selected in comfort zone 2-2. Likewise, relatively small icons are shown as selected in comfort zone 3-2. Specifically, icons 732a, which are arranged in the bottom two rows, are selected in comfort zone 3-2.

The selected icons that have been adjusted in size or position in comfort zones 714, 724, and 734, which may also be respectively referred to as comfort zones 1-2, 2-2 and 3-2 are displayed respectively in comfort zones 1-3, 2-3, and 3-3. For example, icons 716 outside the display area of comfort zone 1-3 are moved to a next page in comfort zone 1-3. The sizes and intervals of the selected icons 722a in comfort zone 2-2 are returned to the original sizes and intervals in comfort zone 2-3. Specifically, since an area defined by the first to third rows in comfort zone 2-3 is small relative to an area defined by the last row, some icons are moved from the current page to the next page due to the size adjustment. The sizes of the icons 732a shown as selected in comfort zone 2-3 are adjusted appropriately according to a user input or the like and then displayed in comfort zone 3-3. Due to the size adjustment of the icons 732a, some icons are moved to the next page. The next page displays the icons moved due to the shape of comfort zone 3-1 as well as the icons moved due to the size adjustment.

As described above, comfort zones 1-1 to 3-3 that display icons may be determined according to a user input related to icon sizes and positions, received on the display unit 305 under the control of the UI layout converter 320. A user input may select between individual adjustment and uniform adjustment of selected icons in size and position.

Figure 8A:
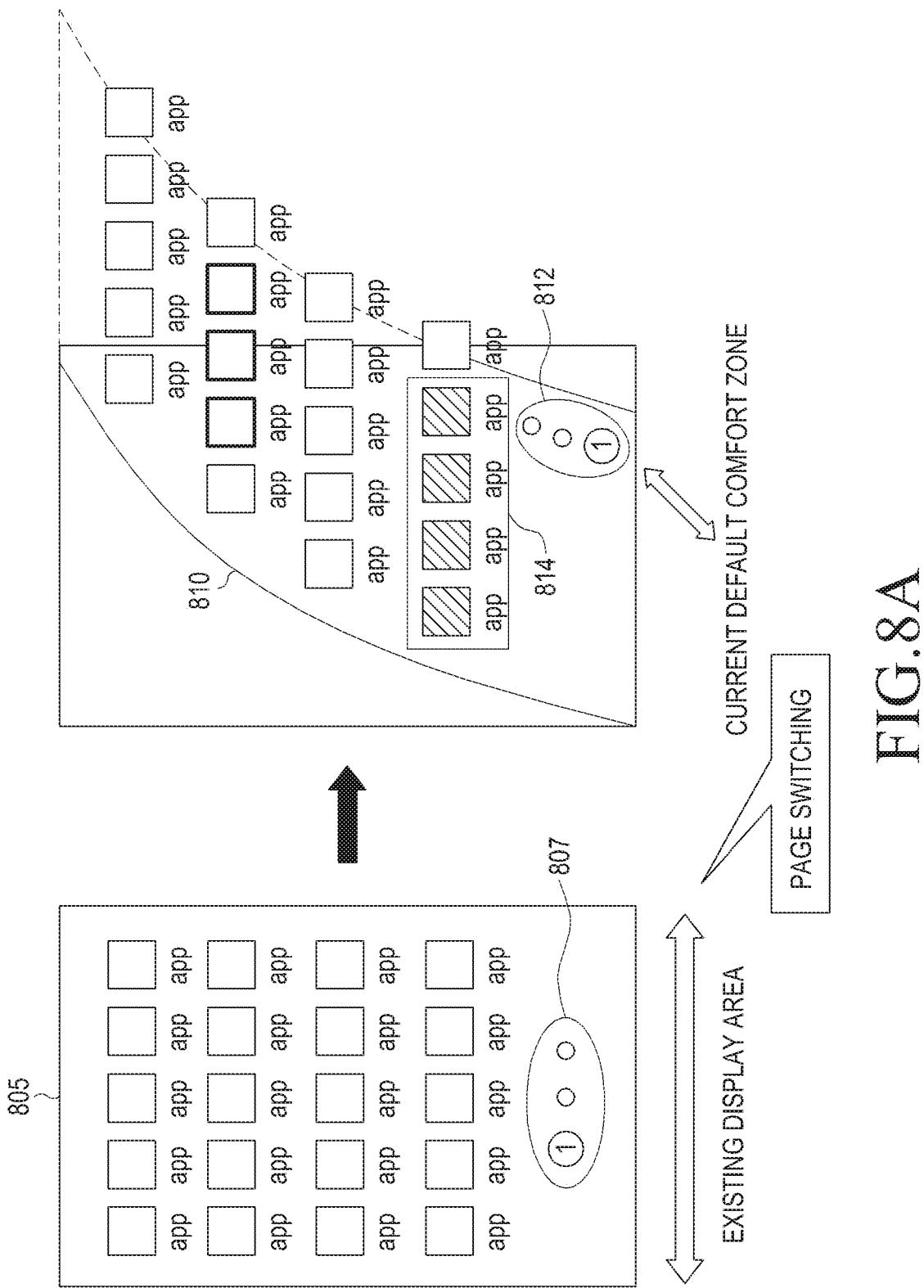
FIG. 8A illustrates an icon layout on a home screen and an initial operation according to an exemplary embodiment of the present invention.

FIG. 8A illustrates an icon layout on a home screen and an initial operation according to an exemplary embodiment of the present invention.

Referring to FIG. 8A, a home screen with icons arranged with the same size and interval is displayed on an existing display area 805. The home screen with the icons rearranged at new coordinates is displayed in a current comfort zone 810. The rearranged icons have the original size and interval. Considering that the comfort zone 810 is defined as an area touchable by a thumb of a one-hand user, the comfort zone 810 has a relatively small available area for icons as compared to the existing display area 805. Accordingly, as the icons are rearranged with the original size and interval in the comfort zone 810, a part of the rearranged icons may be moved to the next page. In this case, the user may adjust the sizes and intervals of the icons so that all of the icons may be displayed within the current page or only frequently used icons may be displayed on the home screen according to the user's preferences. The rearranged icons may be displayed on the current and next pages according to their use frequencies. While a page number 807 indicating the current page is written horizontally in the existing display area 805, the present invention is not limited thereto, and the page number 807 may be written according to a thumb moving direction in the comfort zone 810, as indicated by reference numeral 812.

If the user determines to adjust the sizes, intervals, and layout of the icons after viewing the icons displayed in the comfort zone 810, the user first selects icons to be adjusted from among the displayed icons. For the convenience of description, the selected icons are shown as shaded in the comfort zone 810. For example, the user may select an intended icon by clicking on the icon once or dragging the icon without detaching a hand from the icon, then a selection area 814 including selected icons is displayed. When the user touches a part of the selection area 814 or one of the selected icons, the home screen of the comfort zone 810 displays a window for a specific setting of rearrangement of the selected icons.

Figure 8B:
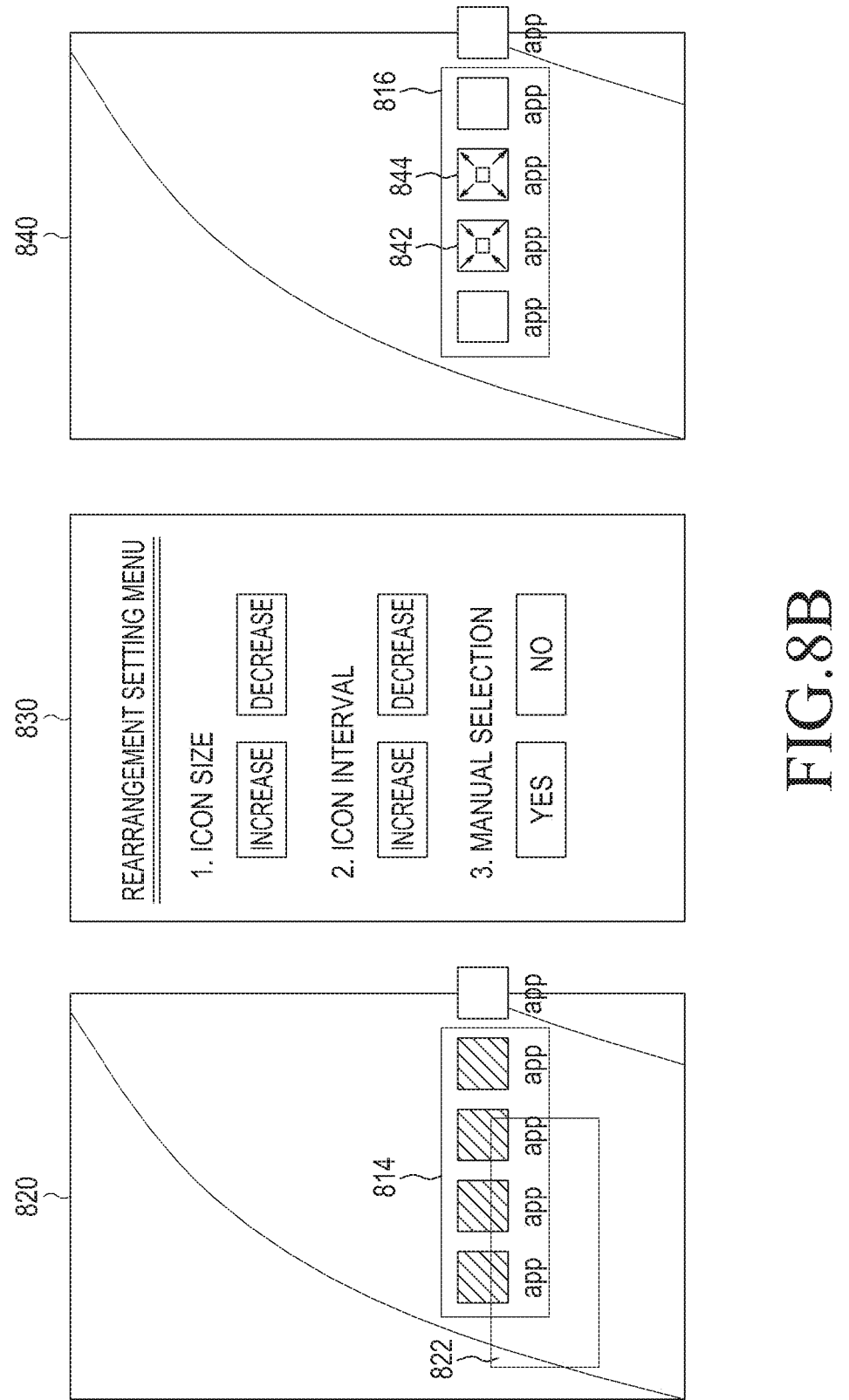
FIG. 8B illustrates screens displayed for a specific setting of rearranging selected icons according to an exemplary embodiment of the present invention.

FIG. 8B illustrates screens displayed for a specific setting of rearranging selected icons according to an exemplary embodiment of the present invention.

Referring to FIG. 8B, a first screen 820 displays a pop-up window 822 overlapped over the selection area 814, for a specific setting of rearrangement. For example, the first screen 820, which is rendered transparent, may be displayed simultaneously with the selection area 814. In this case, upon receipt of a user input requesting a specific setting of rearrangement, the icons of the selection area 814 may be displayed as a preview reflecting the user input. Alternatively, upon receipt of a user input requesting a specific setting of rearrangement, icons rearranged according to the setting indicated by the user input may be displayed, simultaneously with disappearance of the pop-up window 822.

A second screen 830 displays a rearrangement setting menu independently of the existing display area 810. For example, the rearrangement setting menu provides menu items with which to select increase or decrease in the size and interval of a selected icon. When the user selects an increase or decrease button in the size and interval of the selected icon, a button with which to adjust the degree of increase or decrease, such as a rate button may further be displayed. According to another exemplary embodiment, the rearrangement setting menu provides Yes and No buttons for 'manual selection' so that the user may manually rearrange the positions or intervals of selected icons. If the Yes button is selected in the second screen 830, then, as shown in a third screen 840, a reference icon 842 or 844 may be selected according to a user input, such as click or touch, on the icon 842 or 844 in the third screen 840. As the size of the reference icon 842 or 844 is adjusted, the sizes and intervals of the icons in the selection area 814 may be adjusted uniformly. For example, the reference icon 842 or 844 may be scaled down or up by dragging the reference icon 842 inward or dragging the reference icon 844 outward in accordance with an intended size. In addition, an area corresponding the distance between icons may be adjusted by touching or clicking on the area and then dragging the area inward or outward according to an intended interval. In another example, the size and interval of each individual icon within the selection area 814 may be adjusted by dragging a touch or click on the icon according to an intended size or interval, rather than the icons of a selected area 816 which are adjusted in size and interval at one time by setting a reference icon.

Figure 9A:
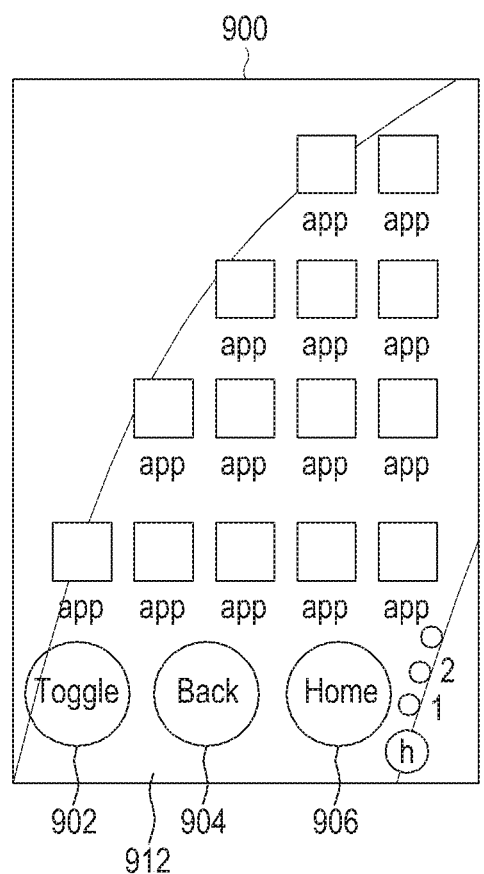
FIG. 9A illustrates a screen that displays additional UIs available for rearrangement of selected icons according to an exemplary embodiment of the present invention.

FIG. 9A illustrates additional UIs available for rearrangement of selected icons according to an exemplary embodiment of the present invention.

Referring to FIG. 9A, a screen 900 displays additional UIs, which may be icons, buttons, or similar graphical displays, that are not provided in the existing display area 805 of FIG. 8A, for example, a toggle button 902, a back button 904, and a home button 906. The toggle button 902 is a UI that receives a command to set a comfort zone 912 displayed on the screen 900 as a frequently used page, or the toggle button 902 is able to use as a UI that receives a command to convert between the existing display area 805 and the comfort zone 810. While not shown in FIG. 9A, it is assumed that the comfort zone 912 displays icons rearranged in the manner described before with reference to FIGS. 8A and 8B. The back button 904 is for receiving a command to return to the previous screen. The home button 906 is for receiving a command to return to a home screen, the comfort zone 810, by way of example.

While it is described herein that icons are displayed as an exemplary content type in a display area for the convenience of description, the present invention is not limited thereto, and the present exemplary embodiment is applicable to many other types of content.

Figure 9B:
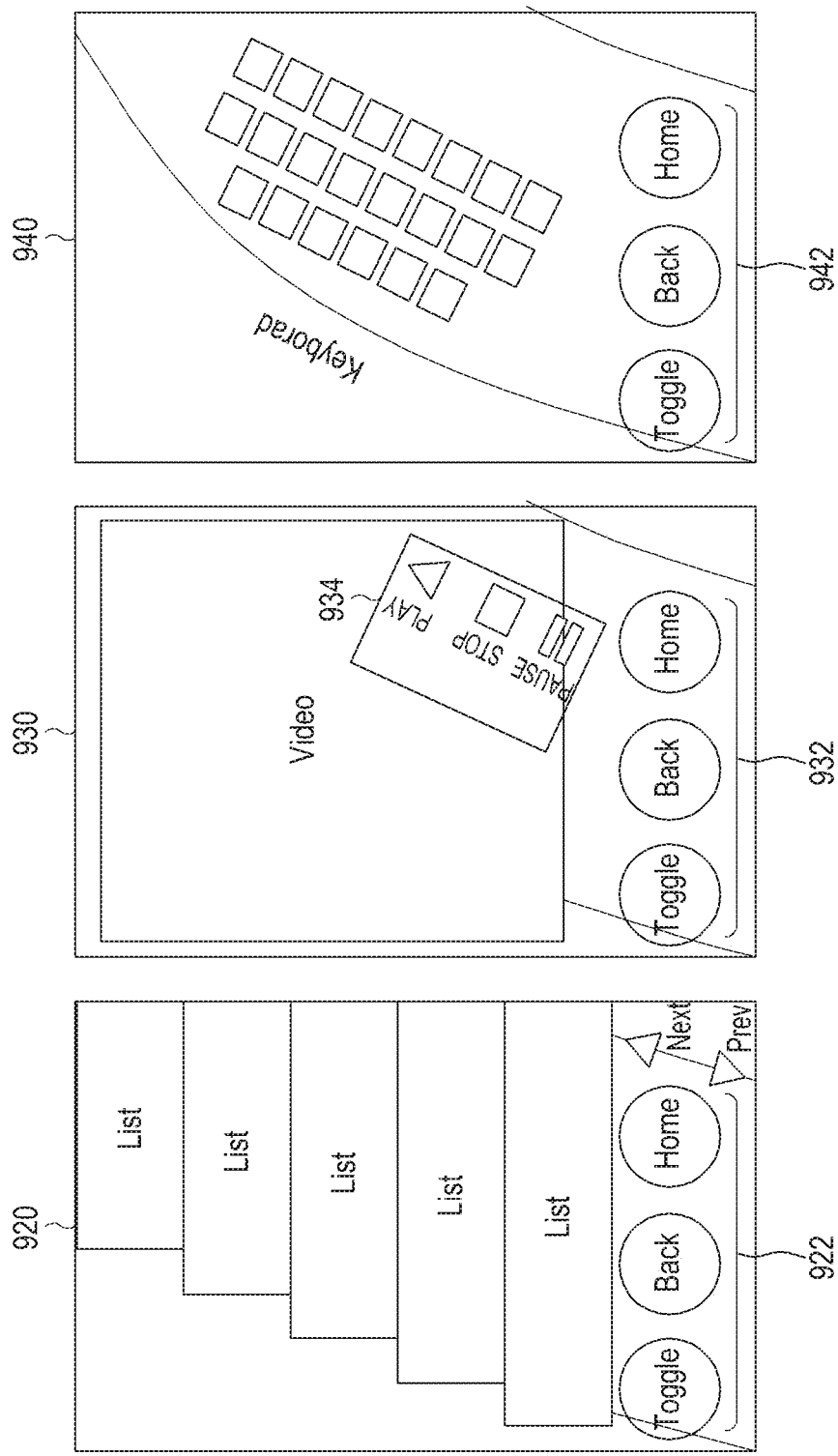
FIG. 9B illustrates screens that display additional UIs available on a content basis for rearrangement of selected icons according to an exemplary embodiment of the present invention.

FIG. 9B illustrates additional UIs available on a content basis for rearrangement of selected icons according to an exemplary embodiment of the present invention.

Referring to FIG. 9B, a first screen 920 displays additional UIs 922 including a toggle button, a back button, and a home button, when lists are rearranged as content in a comfort zone. A second screen 930 displays additional UIs 932 including a toggle button, a back button, and a home button, when multimedia, for example, videos, are rearranged as content in a comfort zone. In view of the content nature of the videos, UIs 934 may further be provided for the user to view the videos. For example, the UIs 934 may include a play button, a pause button, a stop button, and the like. A third screen 940 displays additional UIs 942 including a toggle button, a back button, and a home button, when a keyboard is rearranged as content in a comfort zone.

Figure 10A:
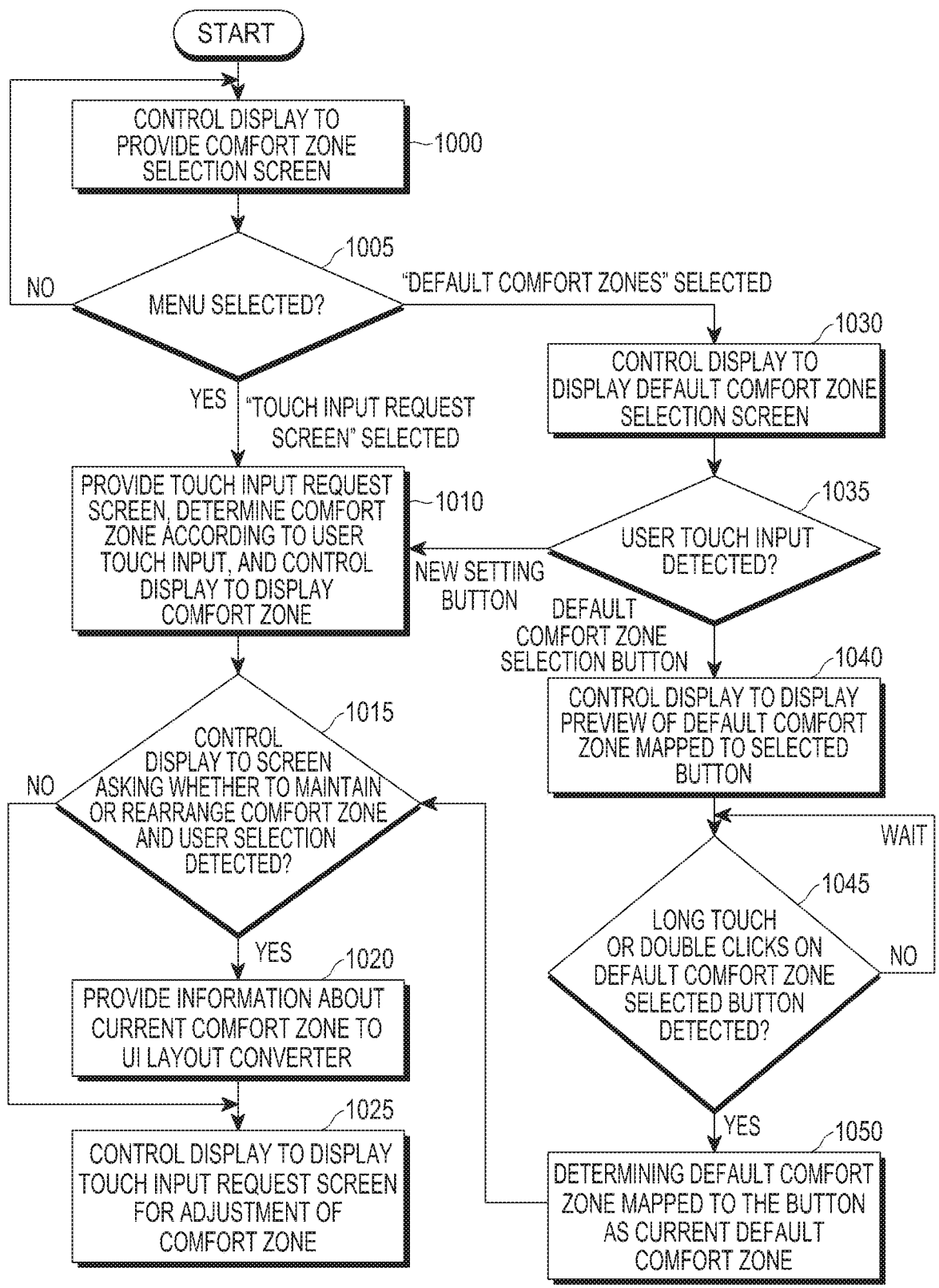
FIG. 10A is a flowchart illustrating an operation of the comfort zone decider in a touch screen control apparatus according to an exemplary embodiment of the present invention.

FIG. 10A is a flowchart illustrating an operation of a comfort zone decider in a touch screen control apparatus according to another exemplary embodiment of the present invention.

Referring to FIG. 10A, the comfort zone decider 310 may control the display unit 305 to provide a comfort zone selection screen including, for example, at least one of a button that requests a touch input request screen (not shown) to determine a comfort zone and a button that selects preset default comfort zones in step 1000. The comfort zone selection screen may be, for example, a locked home screen or an additional screen requesting a user touch input. Whether the locked home screen or the additional screen requesting a user touch input is provided as the comfort zone selection screen and the touch input request screen on the display unit 305 may be preset by the user or by default by the manufacturer. For example, if the comfort zone selection screen provides only the button that selects the default comfort zones, the button may have menu items that indicate use and non-use of the default comfort zones. Upon sensing a user touch input that selects a menu item indicating non-use of the default comfort zones, the comfort zone decider 310 may set a comfort zone based on a user touch input that unlocks the locked screen according to the aforedescribed exemplary embodiment of the present invention.

Figure 10B:
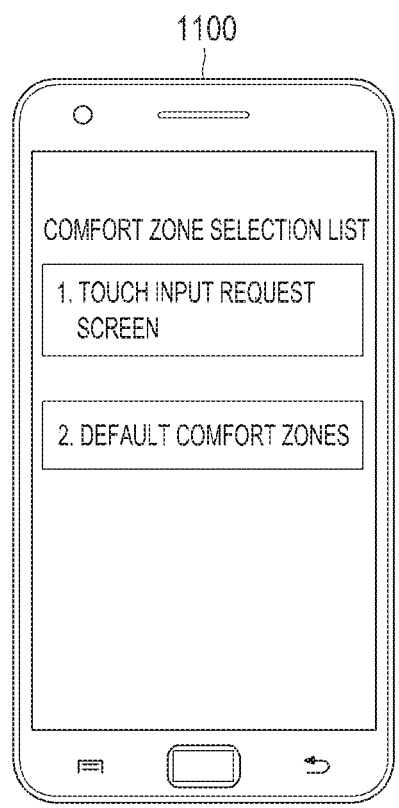
FIG. 10B illustrates a comfort zone selection screen according to an exemplary embodiment of the present invention.

FIG. 10B illustrates a comfort zone selection screen according to another exemplary embodiment of the present invention.

Referring to FIG. 10B, a comfort zone selection screen 1100 may display a comfort zone selection list on the touch screen corresponding to the display unit 305. The comfort zone selection list may include a menu 'touch input request screen' and a menu 'default comfort zones' as illustrated in FIG. 10B. These menus are displayed as buttons so that the user may select a menu by touching a button corresponding to the menu.

Figure 10C:
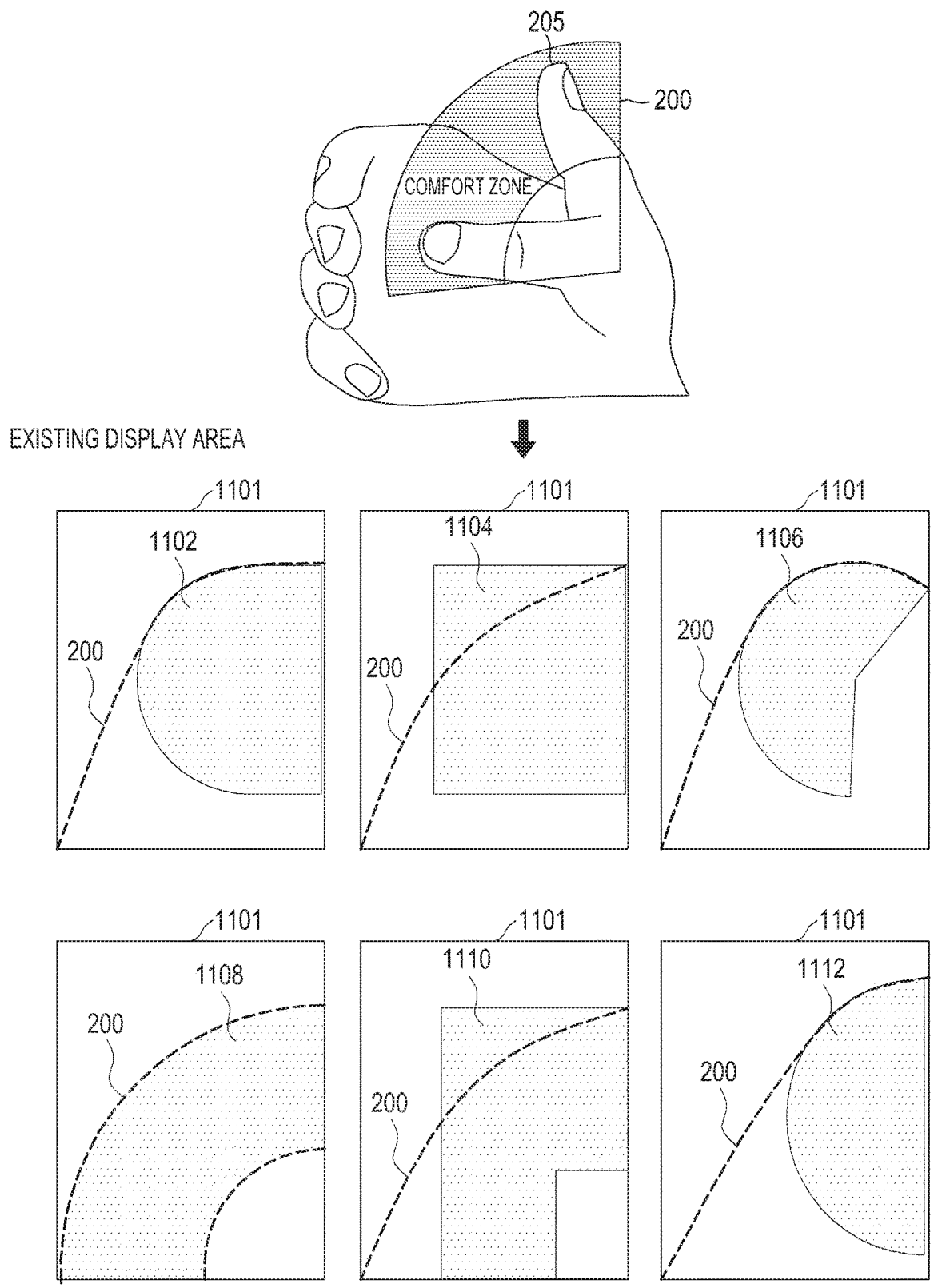
FIG. 10C illustrates default comfort zones pre-stored in a touch screen control apparatus according to an exemplary embodiment of the present invention.

FIG. 10C illustrates default comfort zones pre-stored in the touch screen control apparatus according to an exemplary embodiment of the present invention.

Referring to FIG. 10C, default comfort zones are defined based on the fan-shaped area 200 illustrated in FIG. 2 corresponding to a range touchable by a thumb on the touch screen. The default comfort zones may be preset by the user or by default by the manufacturer according to the above described exemplary embodiments of the present invention.

To offer a wide range of default comfort zones satisfying users' preferences in an existing display area 1101, the default comfort zones may configured by adding an area outside the fan-shaped area 200 or excluding a part from the fan-shaped area 200. Specifically, a first default comfort zone 1102 is fully included in the fan-shaped area 200. A second default comfort zone 1104 is shaped into a rectangle partially overlapped with the fan-shaped area 200. A third default comfort zone 1106 is a part of the fan-shaped area 200, particularly except for a thumb-untouchable area other than a shaded area of the fan-shaped area 200.

A fourth default comfort zone 1108 is configured by removing the non-shaded area of the fan-shaped area 200, untouchable by the thumb of the user. A fifth default comfort zone 1110 is shaped into a rectangle having a rectangular non-shaded area of the fan-shaped area 200 being removed. A sixth default comfort zone 1112 is a semi-circle having the center point on the right side of the existing display area 1101, fully included in the fan-shaped area 200. Although the shapes of default comfort zones are preset as described above, the default comfort zones may be adjusted by the adjustment operation of FIG. 4C, which will be described later in detail.

The comfort zone decider 310 determines a menu selected from the comfort zone selection list according to a user touch input in step 1005. If the menu requesting a touch input request screen has been selected, then the comfort zone decider 310 performs steps 1010 through 1025 in the same manner as steps 410 through 425 of FIG. 4. Thus steps 1010 through 1025 will not be described herein to avoid redundancy.

On the other hand, if the menu requesting default comfort zones has been selected, then the comfort zone decider 310 controls the display unit 305 to display a screen, hereinafter, referred to as a 'default comfort zone selection screen', used to select a specific default comfort zone from among pre-stored default comfort zones in step 1030 and proceeds to step 1035.

Figure 10D:
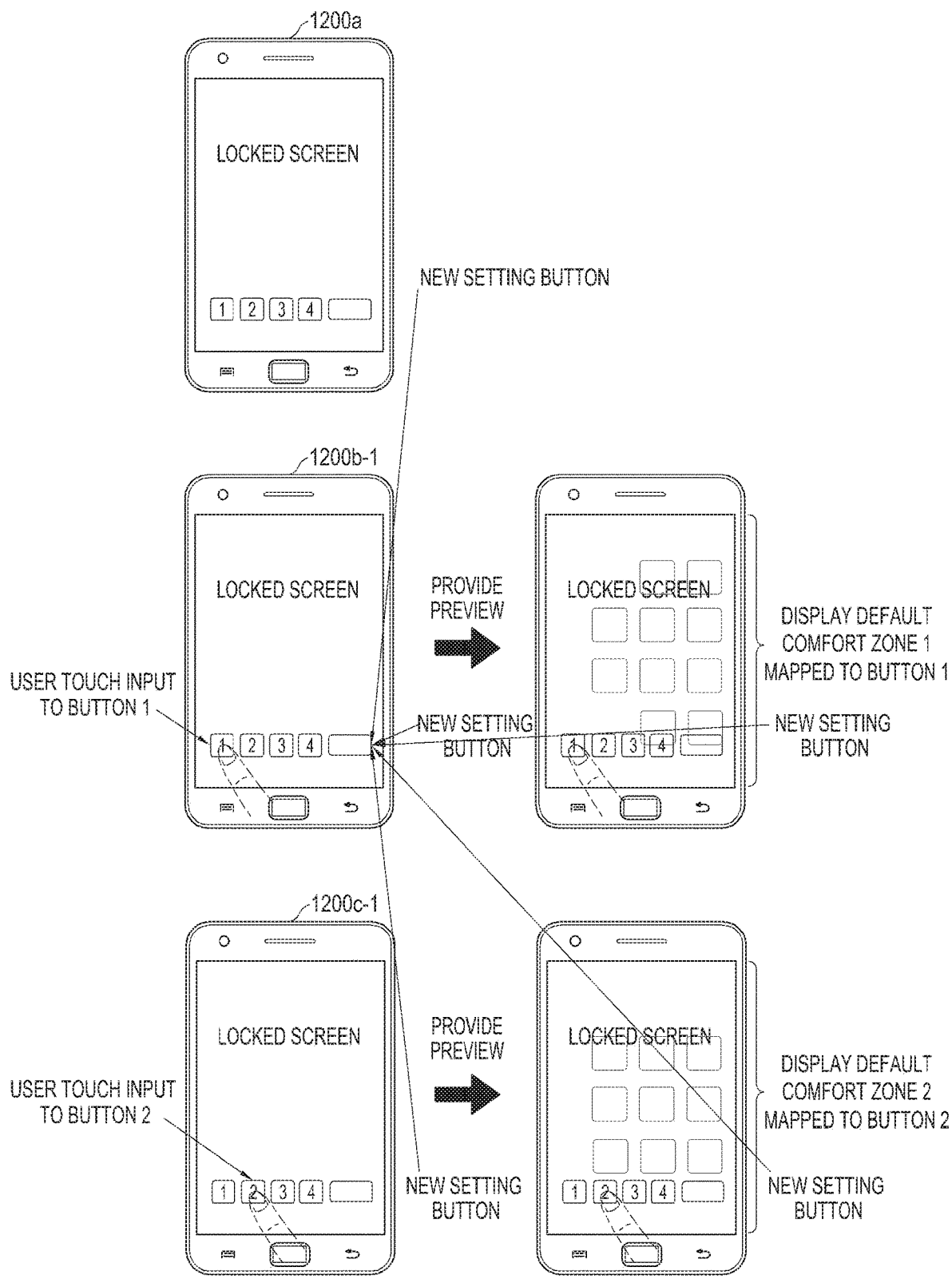
FIG. 10D illustrates a default comfort zone selection screen according to an exemplary embodiment of the present invention.

FIG. 10D illustrates a default comfort zone selection screen according to an exemplary embodiment of the present invention. The default comfort zone selection screen may also be a locked home screen or an additional screen requesting a touch input.

Referring to FIG. 10D, if a default comfort zone selection screen is a locked home screen, a first default comfort zone selection screen 1200a may display buttons that are one-to-one mapped to pre-stored default comfort zones, hereinafter, referred to as 'default comfort zone selection buttons', and a button used to configure a new default comfort zone, hereinafter, referred to as a 'new setting button', at the bottom of the display area. The default comfort zone selection buttons are shown as numerals in FIG. 10D.

In step 1035, the comfort zone decider 310 determines whether a user touch input is detected. Upon detecting a user touch input to a default comfort zone selection button in the menus provided on the default comfort zone selection screen in step 1035, then, in step 1040, the comfort zone decider 310 controls the display unit 305 to display a preview of a comfort zone mapped to the default comfort zone selection button. In an exemplary embodiment of the present invention, upon sensing a short touch or a single click on a default comfort zone selection button, the comfort zone decider 310 provides a preview of a default comfort zone corresponding to the default comfort zone selection button. Upon sensing a long touch or double clicks on a default comfort zone selection button, the comfort zone decider 310 determines a default comfort zone mapped to the default comfort zone selection button as a current default comfort zone.

For example, a user touch input to button 1 is sensed in a second default comfort zone selection screen 1200b-1. If the user touch input to button 1 is a short touch or single click, the second default comfort zone selection screen 1200b-1 provides a preview of a default comfort zone corresponding to button 1. A user touch input to button 2 is sensed in a third default comfort zone selection screen 1200c-1. If the user touch input to button 2 is a short touch or single click, then the third default comfort zone selection screen 1200c-1 provides a preview of a default comfort zone corresponding to button 2.

In step 1045, the comfort zone decider 310 determines whether a user touch input being a long touch or double clicks on a specific default comfort zone selection button is detected. If a user touch input has not been detected, in step 1045, in the form of a long touch or double clicks on a specific default comfort zone selection button, then the comfort zone decider 310 awaits detection of a user touch input.

On the other hand, if a user touch input being a long touch or double clicks on a specific default comfort zone selection button has been detected in step 1045, then the comfort zone decider 310 determines a default comfort zone mapped to the button as a current default comfort zone in step 1050. Subsequently, the comfort zone decider 310 performs an adjustment operation on the current default comfort zone in steps 1015 through 1025. As noted above, steps 1015 through 1025 are the same as steps 415 through 425 of FIG. 4 and thus will not be described herein. Although not shown, upon sensing a user touch input to the new setting button in the menus provided by the default comfort zone selection screen in step 1035, the comfort zone decider 310 may control the display unit 305 to provide a touch input request screen.

Figure 10E:
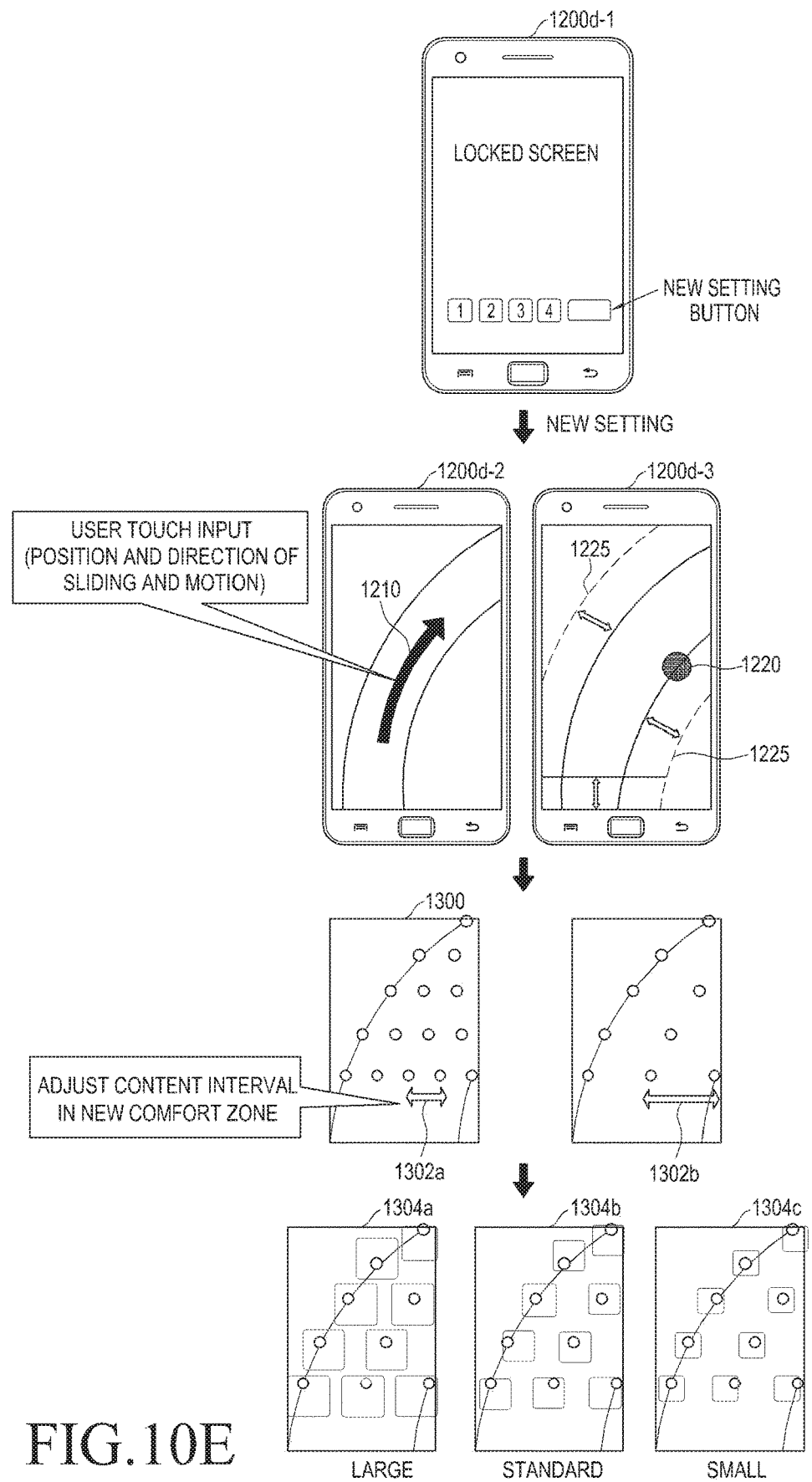
FIG. 10E illustrates a case where a 'new setting button' button is selected on a default comfort zone selection screen according to an exemplary embodiment of the present invention.

FIG. 10E illustrates a case where the 'new setting button' is selected on a default comfort zone selection screen according to an exemplary embodiment of the present invention.

Referring to FIG. 10E, a user touch input to the new setting button is sensed on a fourth default comfort zone selection screen 1200d-1. The fourth default comfort zone selection screen 1200d-1 provides a touch input request screen 1200d-2 to allow the user to set a new comfort zone. Herein, a direction 1210 in which the user slides or drags the thumb across the touch screen is sensed. The comfort zone decider 310 may estimate a touchable area based on the touched area and the sensed sliding or dragging direction 1210 and may determine the estimated touchable area as a new comfort zone.

Once the comfort zone decider 310 determines the new comfort zone, then the comfort zone decider 310 may control the display unit 305 to display the new comfort zone so that the user may identify the new comfort zone. While not shown, the display unit 305 may display only the boundaries or full area of the determined new comfort zone.

Then the comfort zone decider 310 determines whether the new comfort zone is to be adjusted and performs an adjustment operation based on the determination in steps 1015 through 1025. Specifically, as done in step 415 of FIG. 4, the comfort zone decider 310 controls the display unit 305 to provide a screen asking the user whether to maintain or adjust the new comfort zone and receives a user input in response to the question. Whether the asking screen is to be provided may be preset by default in the digital portable terminal by the manufacturer or may be set freely by the one-hand user during initial setting of the digital portable terminal. For example, the asking screen may prompt the user to make a choice between maintenance and adjustment of the determined comfort zone.

If the user input selects maintenance of the new comfort zone, then the comfort zone decider 310 determines the new comfort zone as a current comfort zone and provides information about the current comfort zone to the UI layout converter 320.

If the user input selects adjustment of the new comfort zone, then the comfort zone decider 310 controls the display unit 305 to provide a touch input request screen 1200d-3 for comfort zone adjustment. Then the display unit 305 displays boundaries 1225 of the new comfort zone on the touch input request screen 1200d-3. When the one-hand user clicks a point 1220 for a predetermined amount of time on a boundary 1225 of the current comfort zone, then the clicked boundary 1225 is placed in an adjustable state. The user may now scale up or down the current comfort zone by dragging the clicked boundary 1225 to an intended position. While a click and dragging scheme is used to adjust a comfort zone in the above exemplary embodiment, the present invention is not limited thereto, and an operation of selecting a boundary of the comfort zone and thus placing the boundary in an adjustable state and an operation of adjusting the boundary may be performed by many other preset inputs. For example, when a boundary of a comfort zone is clicked to an adjustable state, the boundary may be adjusted by a predetermined extent at each click or each time a predetermined motion is recognized.

If a new comfort zone is defined in the afore-described area determination and interval setting operation, then the comfort zone decider 310 adjusts the size of content to be arranged in the new comfort zone and stores the size-adjusted content. The size of the content may be increased or decreased according to preset size levels, for example, large, standard, and small as indicated by reference numerals 1304*a*, 1304*b*, and 1304*c*. While not shown, the content to be displayed in the new comfort zone may be rearranged according to the user's preferences and the use frequencies of the content.

In another exemplary embodiment of the present invention, a range to which a comfort zone set according to the above-described exemplary embodiments is applied may be set additionally. For example, a 'comfort zone apply setting' menu may be added to a basic setting menu in order to set a range to which a comfort zone is applied in a user device.

Figure 11A:
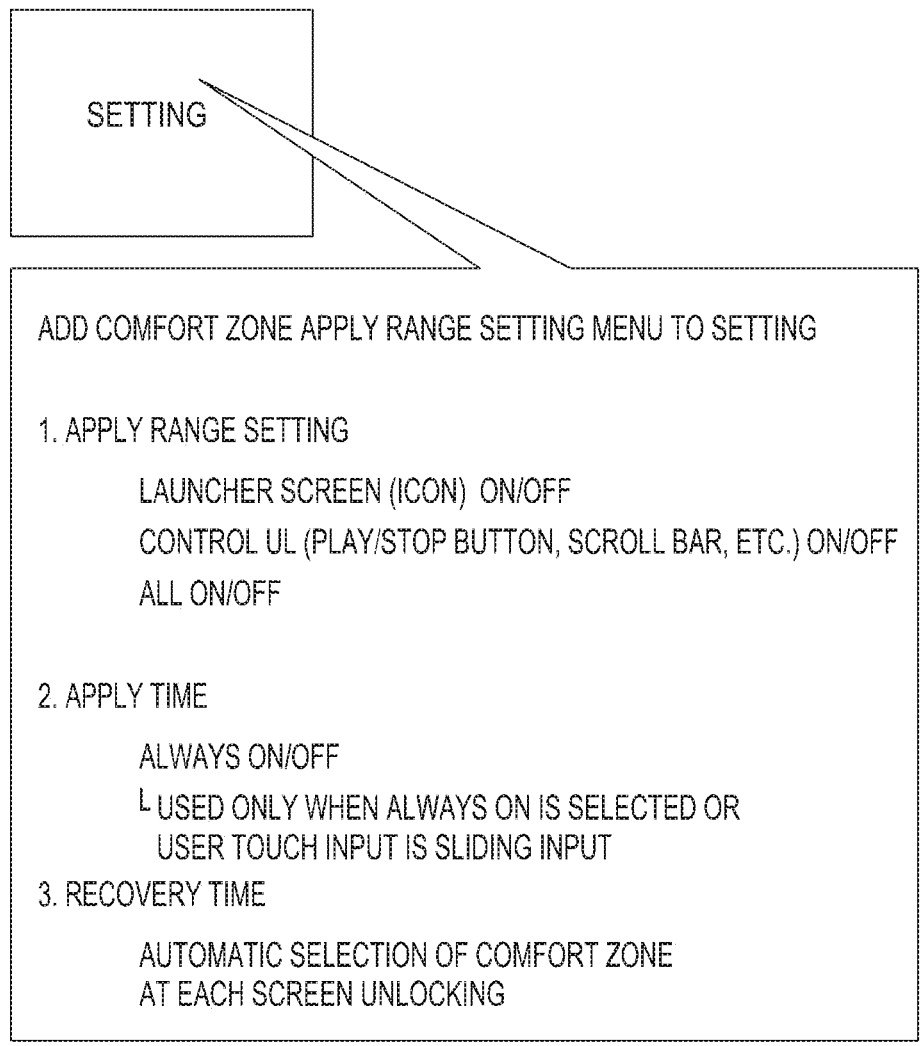
FIG. 11A illustrates menu items of a comfort zone apply setting menu added to a setting menu of a user device according to an exemplary embodiment of the present invention.

FIG. 11A illustrates menu items of a comfort zone apply setting menu added to a setting menu of a user device according to an exemplary embodiment of the present invention.

Referring to FIG. 11A, the comfort zone apply setting menu may include, for example, an 'Apply Range Setting' menu item, an 'Apply Time' menu item, and a 'Recovery Time' menu item.

The 'Apply Range Setting' menu item may include an On/Off button to determine whether to use icons provided on a home screen, an On/Off button to determine whether to apply a specific UI such as an afore-described application control UI, and an On/Off button to determine whether to use all screens and icons available to the user device.

The 'Apply Time' menu item may impose an additional condition that only when the On button indicating that all screens and icons available to the user device are always used is selected and a predetermined motion is made as a user touch input, a comfort zone is applied. The predetermined motion may include a sliding, a drag, a long touch on an area, and the like.

Figure 11B:
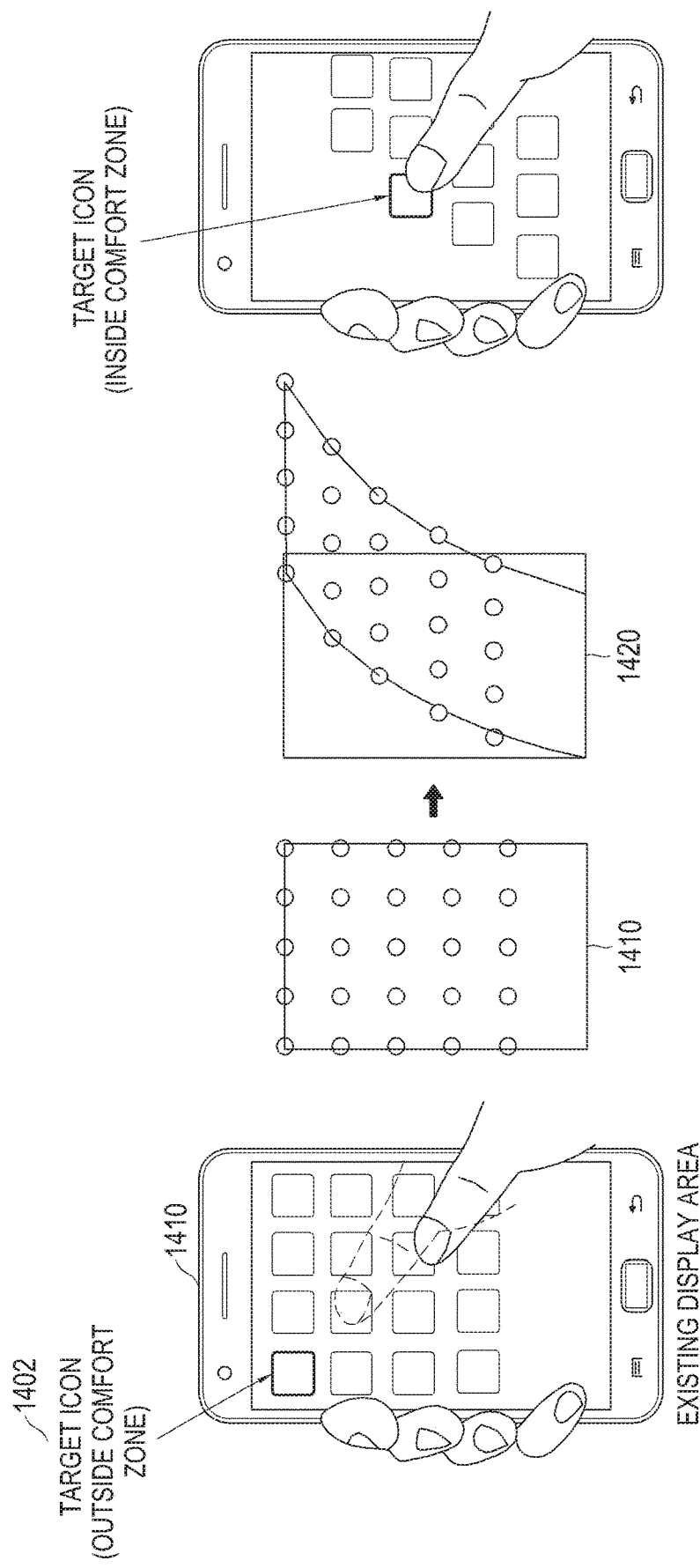
FIG. 11B illustrates a case where if 'Always On' is selected in an 'Apply Time' menu item of the comfort zone apply setting menu, a comfort zone is applied only when a specific sliding motion is made across a touch screen as a user touch input according to an exemplary embodiment of the present invention.

FIG. 11B illustrates a case where if 'Always On' is selected in a 'Apply Time' menu item of the comfort zone usage setting menu, a comfort zone is applied only when a touch input slides across a touch screen according to an exemplary embodiment of the present invention.

Referring to FIG. 11B, it is assumed that 'Apply Time' is set in the setting menu in such a manner that the moment a sliding motion is made in any direction in an existing display area 1410, a comfort zone is effective and a target icon 1402 of a one-hand user is outside of the movement range of a thumb of the one-hand user in the existing display area 1410. If the one-hand user slides the thumb across a part of the display area 1410 in any direction, then the display area 1410 is switched to a current default comfort zone 1420 preset according to the above described exemplary embodiments of the present invention. As the target icon 1402 is moved within the current default zone 1420, then the one-hand user may touch the target icon 1402 with the thumb.

The 'Recovery Time' may include a menu item that automatically switches a locked screen to a comfort zone, each time the locked screen is unlocked. In this case, the comfort zone may be set according to the first exemplary embodiment of the present invention. A recovery time may be set, for example, by making a sliding motion across a screen displaying the comfort zone 1420, reversely to a sliding direction used to switch to the comfort zone 1420. As additional UIs are provided to a user in the above manner, the user may readily use or set icons within a comfort zone of a display area. Therefore, user experience is enhanced.

As is apparent from the above description of the present invention, since a partial touchable area is set in the display area of a touch screen and UIs are rearranged in the partial touchable area by adjusting the sizes and positions of the UIs in a digital portable terminal, a user experience is enhanced. Furthermore, additional UIs are provided to use the rearranged UIs in the partial touchable area, further enhancing user experience.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present invention as described above. Alternatively, one or more processors operating in accordance with stored instructions may implement the functions associated with the exemplary embodiments of the present invention as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of providing user interfaces (UIs) supporting one hand control, the method comprising:
    displaying the UIs on a display area of a touch screen;
    identifying a first area touched by a first touch input on the touch screen;
    in response to identifying the first area, identifying a first touchable partial area corresponding to a range of possible points to be touched on the touch screen, the range of possible points being estimated based on the first area and directional movement of the first touch input;
    displaying the UIs rearranged in the first touchable partial area on the touch screen;
    identifying a second area touched by a second touch input on the touch screen, wherein the second touch input is for adjusting at least one boundary of the first touchable partial area;

in response to identifying the second area, identifying a second touchable partial area corresponding to a range of possible points to be touched on the touch screen, the range of possible points being estimated based on the second area; and displaying the UIs rearranged in the second touchable partial area on the touch screen.

2. The method of claim 1, wherein the UIs comprise at least one of icons, keys of a keyboard, or control buttons of an application.

3. The method of claim 1, further comprising displaying a menu item in a basic setting menu that is preset in an electronic apparatus, the menu item being used to select a rearrangement of the UIs arranged in the display area of the touch screen in a user-touchable partial area.

4. The method of claim 1, wherein at least one of the first touchable partial area or the second touchable partial area is identified based on an area corresponding to a range touchable by a thumb of a user on the touch screen.

5. The method of claim 1,
wherein the first touchable partial area is identified based on at least one of a detection point or a moving direction of the first touch input, and
wherein the second touchable partial area is identified based on at least one of a detection point or a moving direction of the second touch input.

6. The method of claim 5, wherein at least one of the first touch input or the second touch input includes a clicking, a sliding motion, or a drag motion.

7. The method of claim 1, further comprising:
calculating a mapping relationship between coordinates of the first touchable partial area and coordinates of the second touchable partial area; and
converting the UIs of the first touchable partial area to the UIs of the second touchable partial area based on the mapping relationship.

8. The method of claim 1, wherein the UIs being rearranged in the first touchable partial area or the second touchable partial area are rearranged by adjusting at least one of positions, sizes, shapes, or intervals of the UIs.

9. The method of claim 1,
wherein the first touch input comprises a sliding motion in any direction across part of the display area while displaying the UIs on the display area, and
wherein the first touchable partial area is determined regardless of a direction of the sliding motion.

10. The method of claim 1, wherein the first area comprises at least each point of the touch screen touched by the first touch input.

11. An electronic apparatus providing user interfaces (UIs), the electronic apparatus comprising:
a touch screen; and
at least one processor configured to:
control the touch screen to display the UIs on a display area of the touch screen,
identify a first area touched by a first touch input on the touch screen, in response to identifying the first area, identify a first touchable partial area corresponding to a range of possible points to be touched on the touch screen, the range of possible points being estimated based on the first area and directional movement of the first touch input,
control the touch screen to display the UIs rearranged in the first touchable partial area,
identify a second area touched by a second touch input on the touch screen, wherein the second touch input is for adjusting at least one boundary of the first touchable partial area,
in response to identifying the second area, identify a second touchable partial area corresponding to a range of possible points to be touched on the touch screen, the range of possible points being estimated based on the second area, and
control the touch screen to display the UIs rearranged in the second touchable partial area.

12. The electronic apparatus of claim 11, wherein the UIs comprise at least one of icons, keys of a keyboard, or control buttons of an application.

13. The electronic apparatus of claim 11, wherein the at least one processor is further configured to control the touch screen to display a menu item in a basic setting menu that is preset in the electronic apparatus, the menu item being used to select a rearrangement of the UIs arranged in the display area of the touch screen in a user-touchable area.

14. The electronic apparatus of claim 11, wherein at least one of the first touchable partial area or the second touchable partial area is identified based on an area corresponding to a range touchable by a thumb of a user on the touch screen.

15. The electronic apparatus of claim 11,
wherein the first touchable partial area is identified based on at least one of a detection point or a moving direction of the first touch input, and
wherein the second touchable partial area is identified based on at least one of a detection point or a moving direction of the second touch input.

16. The electronic apparatus of claim 15, wherein at least one of the first touch input or the second touch input includes a clicking, a sliding motion, or a drag motion.

17. The electronic apparatus of claim 11, wherein the at least one processor is further configured to:
calculate a mapping relationship between coordinates of the first touchable partial area and coordinates of the second touchable partial area, and
convert the UIs of the first touchable partial area to the UIs of the second touchable partial area based on the mapping relationship.

18. The electronic apparatus of claim 11, wherein the UIs being rearranged in the first touchable partial area or the second touchable partial area are rearranged by adjusting at least one of positions, sizes, shapes, or intervals of the UIs.

* * * * *